United States Patent
Chu et al.

(10) Patent No.: US 10,833,900 B2
(45) Date of Patent: Nov. 10, 2020

(54) JOINT ESTIMATION OF COMMUNICATION CHANNEL EFFECTS IN COMMUNICATION RECEIVERS

(71) Applicant: Lockheed Martin Corporation, Bethesda, MD (US)

(72) Inventors: Liang C. Chu, Sunnyvale, CA (US); John Robert Barry, Atlanta, GA (US); Derrick A. Chu, Atlanta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/717,309

(22) Filed: Dec. 17, 2019

(65) Prior Publication Data

US 2020/0195476 A1 Jun. 18, 2020

Related U.S. Application Data

(60) Provisional application No. 62/780,841, filed on Dec. 17, 2018.

(51) Int. Cl.
  *H04L 27/00* (2006.01)
(52) U.S. Cl.
  CPC .. *H04L 27/0014* (2013.01); *H04L 2027/0024* (2013.01)
(58) Field of Classification Search
  None
  See application file for complete search history.

(56) References Cited

U.S. PATENT DOCUMENTS

| | | | | |
|---|---|---|---|---|
| 6,137,843 A * | 10/2000 | Chennakeshu | ........ | H01Q 1/246 375/340 |
| 10,581,481 B1 * | 3/2020 | Moradi | ................ | H04J 11/0066 |
| 2001/0001616 A1 * | 5/2001 | Rakib | ...................... | H04N 7/10 375/259 |
| 2001/0033614 A1 * | 10/2001 | Hudson | ................ | H04L 1/0618 375/229 |
| 2002/0126741 A1 * | 9/2002 | Baum | ................ | H04J 13/0048 375/144 |
| 2003/0108117 A1 * | 6/2003 | Ketchum | .............. | H04L 1/0026 375/295 |
| 2005/0286465 A1 * | 12/2005 | Zhuang | .............. | H04L 25/0212 370/329 |
| 2006/0078075 A1 * | 4/2006 | Stamoulis | ......... | H04L 25/03171 375/346 |

(Continued)

*Primary Examiner* — Lana N Le
(74) *Attorney, Agent, or Firm* — Michael Best & Friedrich LLP

(57) ABSTRACT

A receiver signal is sampled at a sampling rate equivalent to a chip rate at which chips of a known signal are timed. The resulting receiver signal samples are segmented into receiver signal segments, which are filtered by respective matched filters that are matched to known signal segments segmented from the known signal. Indexes are assigned to elements of the resulting filter response sequences to define an array thereof. Frequency transforms are computed of elements of the filter response sequences in respective columns of the array. Indexes are assigned to elements of the resulting frequency response sequences to define another array thereof. Channel effects imparted on a radio signal are jointly estimated from characteristics of the other array at which at least one local maximum is located.

20 Claims, 13 Drawing Sheets

(56) References Cited

U.S. PATENT DOCUMENTS

| | | | | |
|---|---|---|---|---|
| 2007/0110200 A1* | 5/2007 | Mergen | ................ | H04L 7/0058 375/350 |
| 2007/0211786 A1* | 9/2007 | Shattil | ................... | H04J 13/00 375/141 |
| 2007/0230593 A1* | 10/2007 | Eliaz | ................ | H04L 25/03834 375/260 |
| 2010/0080311 A1* | 4/2010 | Moffatt | ................ | H04L 25/022 375/260 |
| 2010/0080312 A1* | 4/2010 | Moffatt | .............. | H04L 27/2618 375/260 |
| 2010/0142598 A1* | 6/2010 | Murray | .............. | H04L 27/2653 375/219 |
| 2011/0268161 A1* | 11/2011 | Yonge, III | ......... | H04L 25/0236 375/211 |
| 2012/0188995 A1* | 7/2012 | Sihlbom | ............... | H04W 56/00 370/344 |
| 2014/0105325 A1* | 4/2014 | Huang | .............. | H03H 17/0642 375/296 |
| 2016/0050095 A1* | 2/2016 | Atungsiri | ............ | H04L 27/2678 375/300 |
| 2017/0302482 A1* | 10/2017 | Pathikulangara | ............................ | H04L 25/03834 |

* cited by examiner

JOINT ESTIMATION OF COMMUNICATION CHANNEL EFFECTS IN COMMUNICATION RECEIVERS

RELATED APPLICATION DATA

This application claims benefit of priority under 35 U.S.C. § 119(e) from U.S. Provisional Patent Application No. 62/780,841 entitled "Joint Acquisition of Doppler and Delay for Direct Sequence Spread Spectrum Signals," filed on Dec. 17, 2018, the entire disclosure of which incorporated herein by reference.

BACKGROUND

Direct-sequence spread spectrum (DSSS) is a modulation technique used to reduce overall signal interference. With DSSS, the message signal comprises message bits that are modulated by a bit sequence known as a Pseudo Noise (PN) code (a pseudorandom sequence of −1 and 1 values). The PN code is comprised of radio pulses commonly referred to as chips that are much shorter in duration than the message bits. Such modulation of the message signal results in a signal that resembles white noise with a bandwidth nearly identical to that of the PN sequence. The smaller the chip duration, the larger the bandwidth of the resulting DSSS signal, which results in better resistance against interference. The original message bits may be reconstructed from this noise-like signal at a receiver by multiplying the signal by the same PN code in a process known as "de-spreading," where the transmitted PN sequence is correlated with the PN sequence known to the receiver.

Among the advantages of DSSS is its security; information conveyed using DSSS techniques can be difficult to intercept without the PN code used by the transmitter. But knowing the PN code alone may be insufficient to recover the message bits from the received signal in certain situations. Consider communication between a maritime/terrestrial mobile platform on the open water/ground and a friendly aerial platform (e.g., aircraft, UAV, hypersonic vehicle and missile) flying quickly at a very low angle of elevation in order to evade enemy detection. A covert and reliable low probability detection (LPD) communication link is desired with friendly aircraft. The covert aspect comes from DSSS and other low probability detection waveform characteristics, while the reliability aspect comes from the receiver design and signal processing. A DSSS signal can be despread at the receiver as long as the locally generated copy of the spreading signal is subject to the same delays, carrier frequency offsets, and other imperfections (referred to herein as communication channel effects) that are seen by the transmitted signal as it is conveyed over a communication channel. Even small deviations in delay or frequency can prevent reliable despreading. The process of matching the frequency offset and delay of the spreading signal to those of the received signal is generally known as the "code synchronization" problem.

SUMMARY

To estimate channel effects on a radio signal conveyed over a communication channel, sequential receiver signal samples are generated by sampling the received signal at a sampling rate equivalent to a chip rate at which chips of a known signal are timed. The receiver signal samples are segmented into receiver signal segments, which are filtered by respective matched filters to produce respective filter response sequences. The matched filters are maximally responsive to respective known signal segments segmented from the known signal. Indexes are assigned to elements of the filter response sequences to define an array thereof. The elements of the filter response sequences are indexed in a first row order defined by a first sequence order of the known signal segments as distributed across the matched filters and in a first column order defined by a second sequence order in which the receiver signal samples of the receiver signal segments are filtered. Frequency transforms are computed of elements of the filter response sequences indexed in respective columns of the array to produce respective frequency response sequences. Indexes are assigned to elements of the frequency response sequences to define another array thereof. The elements of the frequency response sequences are indexed in a second column order defined by a third sequence order in which the receiver signal samples of the receiver signal segments are filtered and in a second row order defined by a fourth sequence order of the frequency response sequences. Channel effects imparted on the radio signal are jointly estimated from characteristics of the other array at which at least one local maximum is located.

BRIEF DESCRIPTION OF THE DRAWINGS

The descriptions herein are to be read in view of the following figures, where like reference numerals across figures refer to like functional components.

DETAILED DESCRIPTION

Figure 1:
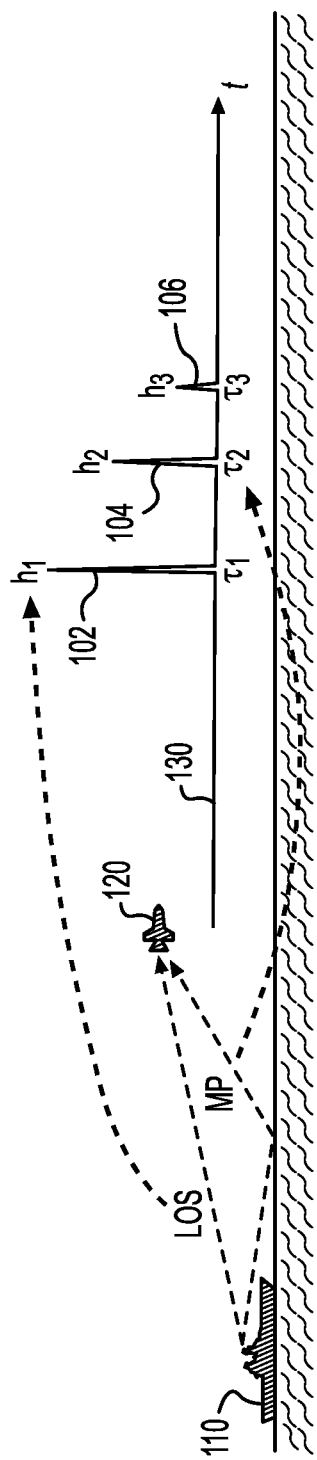
FIG. 1 is a diagram illustrating an example scenario in which principles described herein apply.

The present inventive concept is best described through certain embodiments thereof, which are described in detail herein with reference to the accompanying drawings, wherein like reference numerals refer to like features throughout. The inventive concept is not limited to the illustrative embodiments described below and the following descriptions should be read in such light.

The word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the inventive principles and, where embodiment of the principles underlying the mathematical expressions is intended, the ordinarily skilled artisan will recognize numerous techniques to carry out physical manifestations of the principles being mathematically expressed.

The figures described herein include schematic block diagrams illustrating various functional modules for purposes of description and explanation. Such diagrams are not intended to serve as electrical schematics and interconnections illustrated are merely to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

FIG. 1 is a diagram illustrating an example scenario in which the principles described herein might apply. The broad goal in the illustrated example is communication between seagoing and airborne vessels 110 and 120, respectively. The illustrated scenario assumes still waters and a low altitude flight path of the airborne vessel 120. Under such conditions, a transmitted information bearing signal, e.g., from the seagoing vessel 110, becomes subject to multiple physical processes or effects before it arrives at a receiver on the airborne vessel 120. For example, in addition to line-of-sight (LOS) propagation, copies of the transmitted signal that have reflected from the sea surface arrive at the receiver, indicated in FIG. 1 as multi-path (MP) propagation. In FIG. 1, signal peak 102 corresponds to LOS propagation of the transmitted signal and signal peaks 104 and 106 correspond to MP propagation of the transmitted signal. The received signal 130 is a composite of the LOS and MP signals. Physical processes assert themselves on the LOS and MP signals, which can be modeled through channel gain coefficients $h_1$, $h_2$ and $h_3$, and arrival times $\tau_1$, $\tau_2$ and $\tau_3$ as illustrated in FIG. 1. Additionally, in the general case, there is a significant difference in velocity between the two vessels and, accordingly, the transmitted signal undergoes a Doppler shift before arriving at the receiver. Each component signal corresponding to the different propagation paths may undergo a distinct Doppler shift e.g., $\omega_{D,1}$, $\omega_{D,2}$ and $\omega_{D,3}$.

Figure 2:
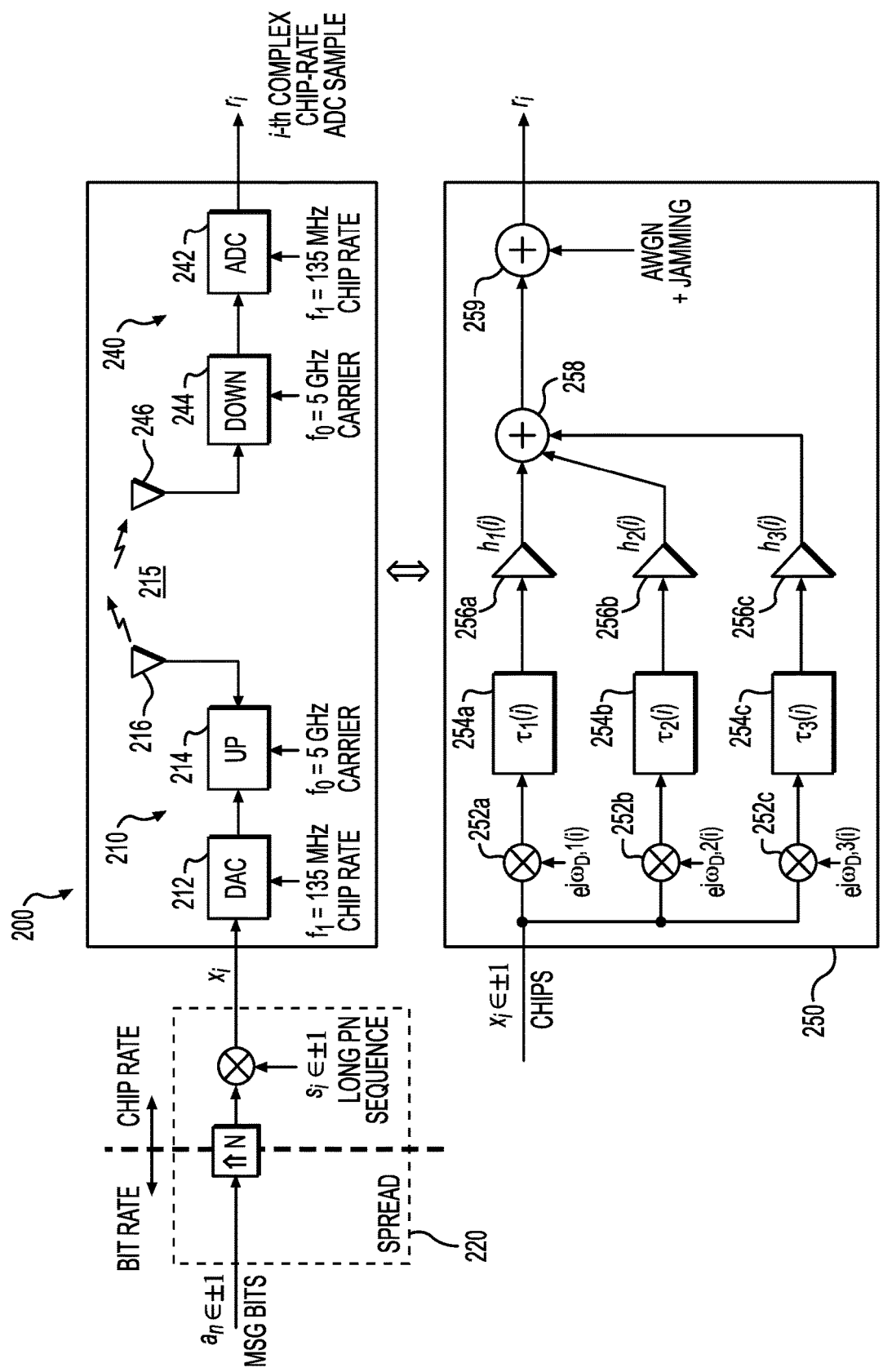
FIG. 2 is a schematic diagram of an example communication system and an associated channel model for purposes of explaining certain fundamentals and assumptions for an example receiver design embodying principles of this disclosure.

FIG. 2 is a schematic diagram of an example communication system 200 with an associated channel model 250 by which certain fundamentals and assumptions for an example receiver design embodying principles of this disclosure is explained. Example communication system 200 comprises a transmitter 210 and a receiver 240, although only those components of transmitter 210 and receiver 240 that are pertinent to channel model 250 are illustrated in the figure. Communication system 200 is assumed to be operating under the conditions described above with reference to FIG. 1, i.e., calm waters and low altitude flight path of the receiving aircraft. Transmitter 210 generates an information bearing signal that is conveyed by electromagnetic wave propagation through a medium 215 (such as air) to receiver 240.

In certain embodiments, communication system 200 implements direct-sequence spread spectrum (DSSS) modulation and, as such, transmitter 210 may include a spreading component 220 that takes as its input bits of a message signal and produces at its output radio pulses of the frequency-spread signal that are timed at the chip rate (e.g., 135 MHz). As illustrated in FIG. 2, within spreading component 220, each message bit $a_n$ may be upsampled to a length of N and may be subsequently modulated with a pseudo-noise (PN) code $s_i$ to produce spread signal chips $x_i$. In certain embodiments, each successive message bit $a_n$ in the message sequence is modulated by a sequence of N chips of the PN code $s_i$ such that successive sequences of PN code chips modulate successive message bits $a_n$. Chips $x_i$ are provided to a digital-to-analog converter (DAC) 212 having a conversion rate equal to the chip rate. The resulting analog signal is upconverted to the carrier frequency (e.g., 5 GHz) by upconverter 214 and the resulting information bearing signal is emitted into medium 215 through an antenna 216.

On the side of receiver 240, the transmitted information bearing signal, which has been subjected to the physical phenomena described above, may be intercepted by an antenna 246 and then downconverted by a downconverter 244. The downconverted signal may then be sampled at the chip rate by an analog-to-digital converter (ADC) 242 to produce complex samples of the transmitted chips, denoted herein as receiver signal samples $r_i$.

Channel model 250 represents the primary physical processes by which each transmitted chip $x_i$ is received as samples $r_i$ and includes not only atmospheric effects, but also system effects of up/down-conversion, sampling, amplification (amplifiers not illustrated), etc. As illustrated in FIG. 2, each chip $x_i$ is subject to delays $\tau_m(i)$ that correspond to the length of the m-th propagation path. In channel model 250, the transmitted signal propagating along each of the paths may undergo a Doppler shift $\omega_{D,m}(i)$, which is reflected in channel model 250 at 252a-252c for Doppler shifts $\omega_{D,1}(i)$, $\omega_{D,2}(i)$ and $\omega_{D,3}(i)$. Additionally, the propagation delays associated with each propagation path are represented in channel model 250 at 254a-254c for respective delay times of $\tau_1(i)$, $\tau_2(i)$ and $\tau_3(i)$. Each chip $x_i$ can also undergo one or more of amplification, range-dependent spreading, atmospheric attenuation, etc. that affect the received signal strength. These factors are reflected in channel model 250 through channel gain coefficients $h_m(i)$, which, in the example illustrated, are represented at 256a-256c for channel gain coefficients $h_1(i)$, $h_2(i)$ and $h_3(i)$. As discussed above, the received signal is a composite of the multipath signal components and such composition is reflected in channel model 250 as a summation indicated at 258. The transmitted signal may also be subject to additive white Gaussian noise (AWGN) and jamming signals, indicated at 259, which are ameliorated by the spread spectrum technique.

To decode the transmitted message from the received signal, compensation for the channel effects described above should be applied. To that end, one must know or at least estimate the number of propagation paths and, for each of those paths, the propagation delay $\tau_m$, the Doppler shift $\omega_{D,m}$ and the channel gain $h_m$. The principles described in this disclosure include a technique to estimate these parameters without having to resort to an expensive exhaustive search over all Doppler shift and delay possibilities.

Figure 3:
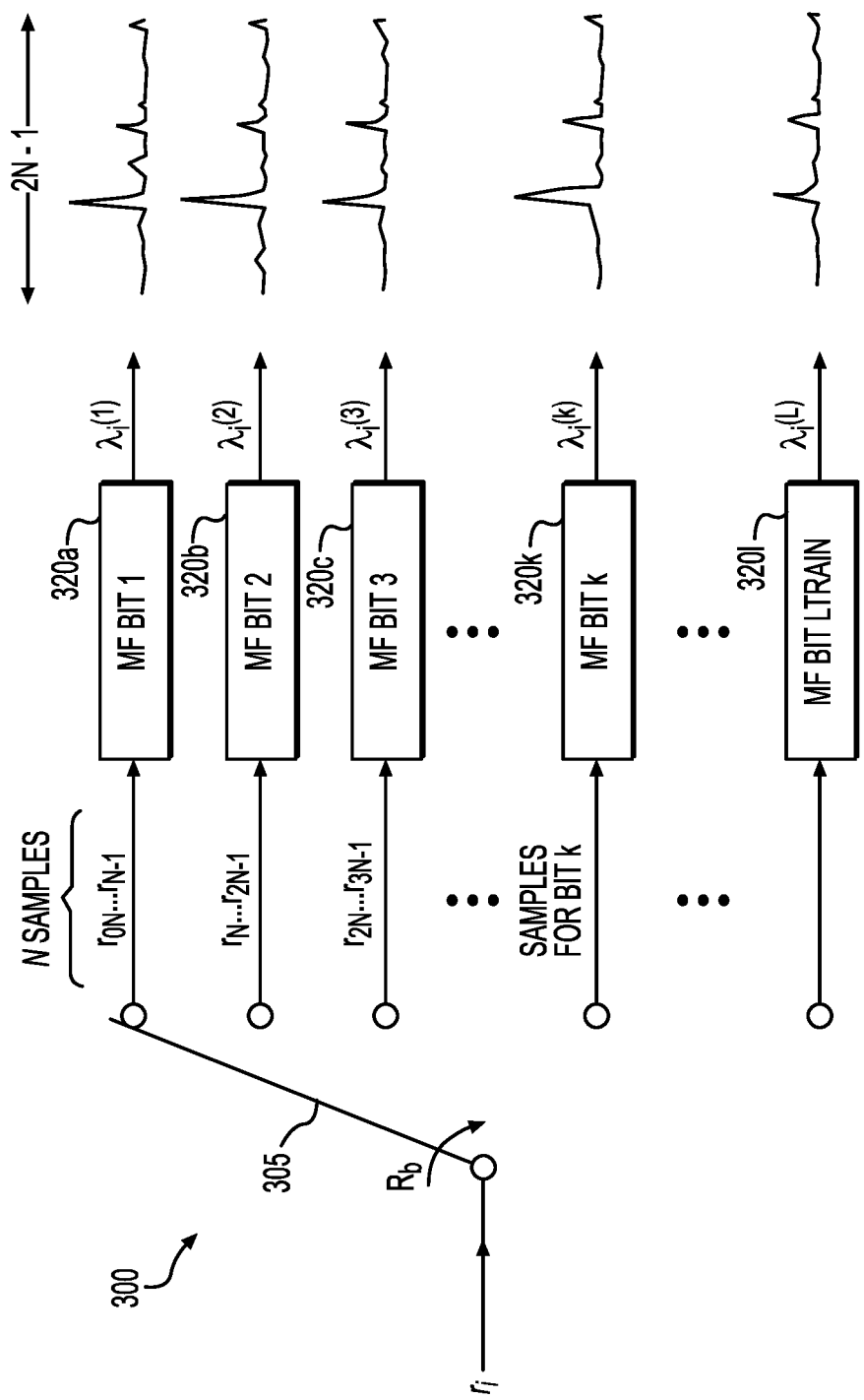
FIG. 3 is a schematic diagram of a matched filter bank scheme by which principles of this disclosure can be embodied.

FIG. 3 is a schematic diagram of a matched filter bank scheme by which principles of this disclosure can be embodied. As discussed above, each message bit $a_n$ is modulated at transmitter 210 by N chips of the PN code such that successive message bits are modulated by a corresponding one of successive N chips of the PN code. Accordingly, a filter bank 300 of L matched filters 320a-320l, representatively referred to herein as matched filter(s) 320, may be constructed such that each matched filter 320 is matched for maximal response in terms of signal-to-noise ratio to the particular sequence of N chips of the PN code that modulated each corresponding message bit $a_n$. In FIG. 3, this action is illustrated as a path selector 305 that feeds successive matched filters 320 at the message bit rate $R_b$. That is, as is illustrated in the figure, matched filter 320a receives a first sequence of N successive samples $r_0$-$r_{N-1}$ corresponding to a first message bit modulated by the first N chips of the PN code, matched filter 320b receives a second sequence of N successive samples $r_N$-$r_{2N-1}$ corresponding to a second message bit modulated by the second N chips of the PN code, and so on, for each of L matched filters 320. The output of each matched filter 320 is a filter response sequence $\lambda_i^{(k)}$, 2N−1 samples of the correlation between the k-th received message bit (delayed, Doppler shifted and with channel gain applied) and the corresponding k-th successive sequence of N PN code chips used to modulate that message bit.

Figure 4:
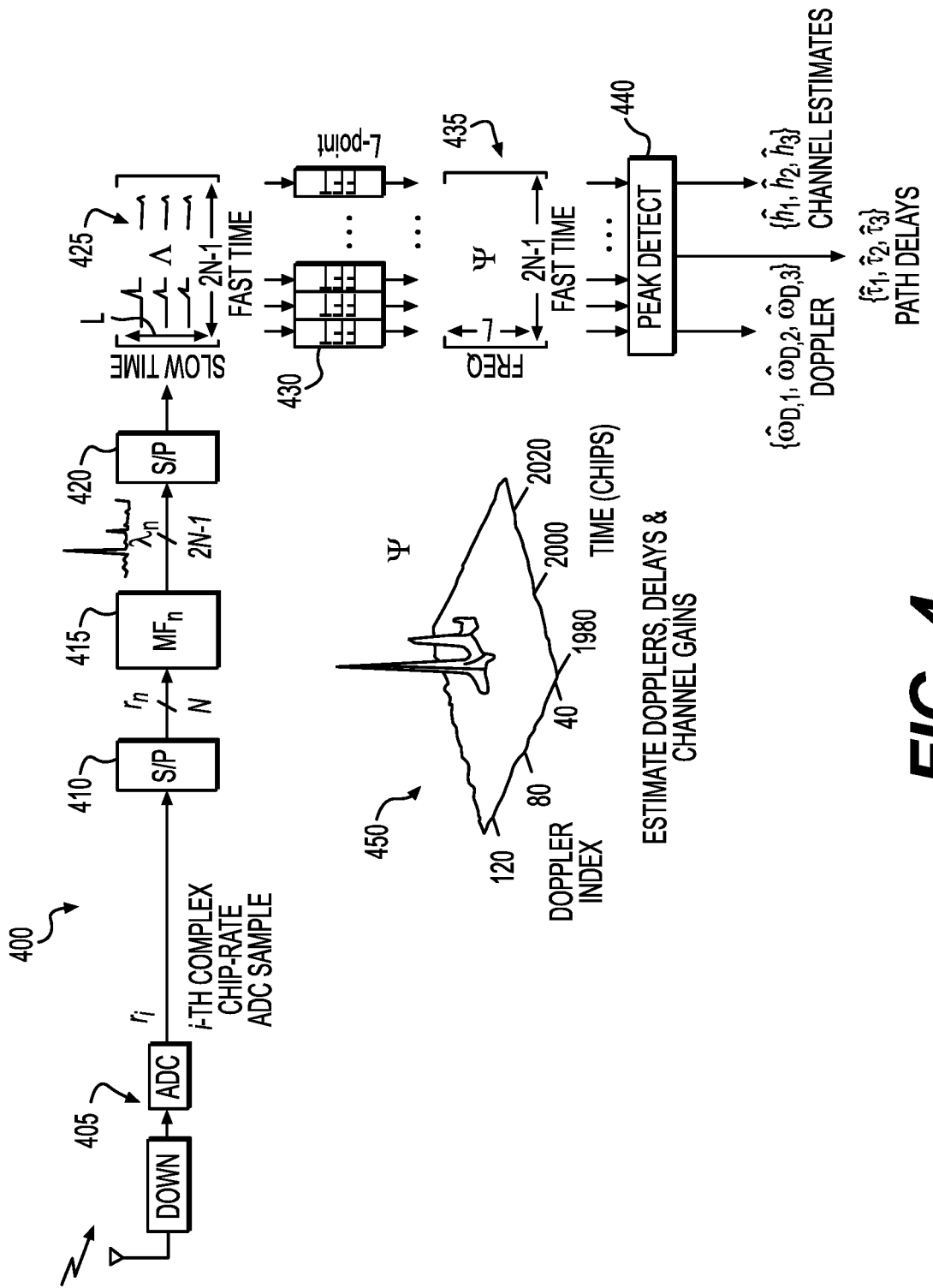
FIG. 4 is a schematic diagram of an estimator by which principles of the present disclosure can be embodied.

FIG. 4 is a schematic diagram of an estimator 400 by which principles of the present disclosure can be embodied. Estimator 400 may take as its input a sequence of complex receiver signal samples $r_i$ from a receiver front end 405, such as by the technique described above with reference to FIG. 2. Samples $r_i$ may be provided to a first serial-to-parallel (S/P) converter 410 that assembles the sequence $r_i$ into L successive sequences of N successive samples $r_i$ (vectors $r_n$) and may provide those data sets to respective L matched filters of matched filter bank 415. Each of the matched filters in filter bank 415 may be maximally responsive to a corresponding one of successive sequences of N successive chips of the PN code, i.e., the matched filter filtering a first sequence of receiver signal samples $r_i$ may be maximally responsive to a first N chips of the PN code sequence, a second sequence of receiver signal samples $r_i$ may be maximally responsive to a second N chips of the PN code sequence, and so forth. The outputs of matched filter bank 415 may be L 2N−1 point filter response data sequences (vectors $\lambda_n$), which may be provided to a second S/P converter 420. S/P converter 420 may be constructed or otherwise configured to align the L 2N−1 point filter response data sequences such that the sequence elements thereof at like sequence locations (relative to the first data point of each filter response data sequence) across the filter response data sequences collectively form respective temporal data sequences timed at the message bit rate. This may be achieved by constructing an L×(2N−1) array or matrix data structure in memory, referred to herein as the Λ-matrix 425, having L rows corresponding to the L matched filters and 2N−1 columns corresponding to the 2N−1 point filter response data sequences. Each column in the Λ-matrix 425 may be comprised of elements of the filter response sequences at like sequence locations thereof that are themselves sequential in terms of the succession order in the PN code of the N PN code chips with which sequential message bits are modulated and to which the respective matched filters are maximally responsive.

In accordance with principles of this disclosure, each column of Λ-matrix 425 or, alternatively, elements of the filter response sequences at like sequence locations thereof across the filter response sequences, may be provided to one of 2N−1 fast Fourier transform (FFT) processors, representatively illustrated by FFT processor 430. Each FFT processor 430 computes the FFT for each column of Λ-matrix 425 based on the message bit rate Rb. The resulting frequency spectrum from each FFT processor 430 may be stored in memory as a column in an L×(2N−1) array or matrix data structure 435, referred to herein as the Ψ-matrix 435. When properly constructed, Ψ-matrix 435 represents a parallel search over a parameter space comprising L different possible frequency offsets (rows of Ψ-matrix 435) and 2N−1 different delays (columns of Ψ-matrix 435). The correct frequency offset and delay may manifest as an entry in Ψ-matrix 435 having a local maximum. Such peaks are illustrated in the Ψ-matrix example 450.

A peak detector 440 may be employed to seek peaks (local maxima) in the data of Ψ-matrix 435, where multiple peaks represent multiple propagation paths. The coordinates of each peak in Ψ-matrix 435 is a joint estimate of the path-specific delay and the path-specific Doppler shift for the corresponding propagation path while the magnitude of each peak represents, within a constant value and noise contributions, the channel gain for the corresponding propagation path. The results of this analysis reveal the number of propagation paths (from the number of peaks), estimates of the path delays $\hat{\tau}_m$ (from the Ψ-matrix column coordinate of the corresponding peak), estimates of the Doppler shifts $\hat{\omega}_{D,m}$ (from the Ψ-matrix row coordinate of the corresponding peak) and estimates of the channel gain $\hat{h}_m$. According to one or more embodiments, channel gain estimates must be obtained from the Ψ-matrix before the magnitude of the matrix is taken, since $h_m$ is normally a complex number. The channel gain estimates may be formulated from $$\hat{h}_m = \frac{\Psi_m}{e^{j\hat{\omega}_{D,m}\hat{\tau}_m}\sum_{k=0}^{K-1}e^{-j\hat{\omega}_{D,m}kP}A^{(k,k)}[0,\hat{\omega}_{D,m}]}$$

where $\Psi_m$ corresponds to the entry of the Ψ-matrix for the corresponding peak before the magnitude is taken, and $A^{(l,l)}[i,\omega_D]=x_i^{(l)}e^{j\omega_Di}*x_{-i}^{*(l)}$ where $x_i^{(l)}$ are the chips that correspond to the lth bit of transmitted signal. The estimates $\hat{\tau}_m$ and $\hat{\omega}_{D,m}$ may be used for coarse signal acquisition, as explained below, while estimates $\hat{h}_m$ may be used to initialize the adaptive channel estimators, as described below.

The number L of matched filters in filter bank 415 may be a selectable parameter that may correspond to the number of message bits used for coarse acquisition of the received signal. If L is chosen too small, the coarse acquisition process is susceptible to noise and, since the frequency step of the FFTs is $R_b/L$, frequency resolution will be lost. If L is chosen too large, agility for rapidly changing channels would be lost.

The coarse channel effects estimation illustrated in FIG. 4 may be performed everytime the receiver loses synchronization with the transmitter. For example, it may be performed at the start of every "fresh" transmission (in which the receiver has no present knowledge of the channel state) or whenever the receiver loses track of the channel state.

Figure 5:
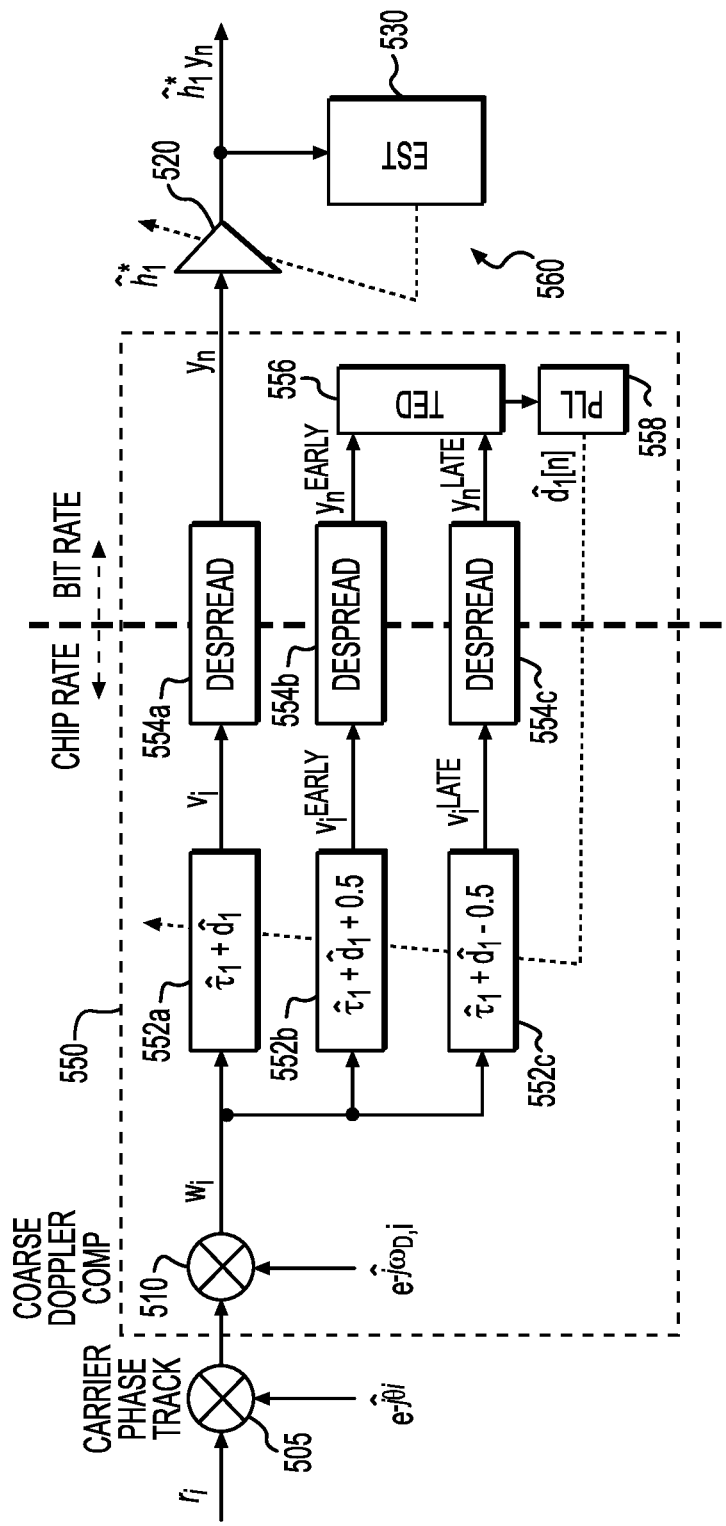
FIG. 5 is a schematic block diagram of example timing and gain tracking by which principles of this disclosure can be embodied.

FIG. 5 is a schematic block diagram of example timing and gain tracking by which principles of this disclosure can be embodied. The timing and gain tracking utilizes the estimates of $\hat{\tau}_m$, $\hat{\omega}_{D,m}$ and $\hat{h}_m$ for coarse signal acquisition and refines such acquisition through suitable receiver mechanisms, examples of which are described herein.

As illustrated in FIG. 5, complex samples $r_i$ may first be provided to a carrier phase shifting component 505 that compensates for carrier phase differences through a variable phase shift $\theta_i$. Example details for example carrier phase tracking are provided below. The output of carrier phase shifting component 505 may be provided to a Doppler/delay processing component 550, which will be referred to herein as DDP component 550. As will be further demonstrated below, a DDP component 550 may be instantiated for each propagation path discovered by the estimation technique described above with reference to FIG. 4.

The signal $r_i e^{-j\theta_i}$ may first be provided to a Doppler compensation component 510 within DDP component 550. Doppler compensation component 510 may apply the path dependent Doppler shift estimate $\hat{\omega}_{D,m}$ to generate a phase compensated signal $w_i$. Phase compensated signal $w_i$ may then be provided to a set of programmable or otherwise variable delay lines 552a-552c, representatively referred to herein as delay line(s) 552. Delay lines 552 form part of a delay locked loop and, to that end, one of delay lines 552, delay line 552b for example, is fixedly advanced by half a chip period while another of delay lines 552, delay line 552c for example, is fixedly retarded by half a chip period. As illustrated in the figure, delay lines 552 generate three (3) signals: $v_i$, which are programmatically delayed by an amount equal to the path-dependent delay estimate $\hat{\tau}_m$ plus a variable refining amount $d_i$, $v_i^{EARLY}$, which is programmatically delayed by an amount equal to $\hat{\tau}_m + d_i$ plus the advance amount of 0.5 times the chip period, and $v_i^{LATE}$, which is programmatically delayed by an amount equal to $\hat{\tau}_m + d_i$ minus the hold back amount of 0.5 times the chip period. The three signals $v_i$, $v_i^{EARLY}$ and $v_i^{LATE}$ may be provided to respective despreading components 554a-554c, representatively referred to herein as despreading component(s) 554, where the received signal is despread using the PN code with which the transmitted signal was frequency-spread. The outputs of despreading components 554 are timed at the message bit rate Rb and are denoted herein as $y_n$, $y_n^{EARLY}$ and $y_n^{LATE}$ in correspondence with the input signals $v_i$, $v_i^{EARLY}$ and $v_i^{LATE}$ from which they are derived. The signal $y_n$ is forwarded to channel gain compensation, which will be discussed below. However, the signals $y_n^{EARLY}$ and $y_n^{LATE}$ serve as input signals to the delay locked loop and, as such, are delivered to a timing error detector (TED) 556. The timing error signal generated by TED 556 may follow the relation $\varepsilon_n = |y_n^{EARLY}| - |y_n^{LATE}|$ and may be used to advance or delay a phase-locked loop (PLL) 558. PLL 558 generates a signal that is indicative of a variable delay amount $d_m[n]$ that is commensurate with the timing error $\varepsilon_n$ for n-th message bit period. The delay amount $d_m[n]$ may be adjusted to a fine resolution, including subchip intervals, the timing tracking resolution being limited only by the PLL used. The PLL output signal that is indicative of $d_m[n]$ may be applied across the set of delay lines 552 to close the delay locked loop. In one embodiment, the delay locked loop is updated at the bit rate $R_b$ according to:

$$d_m[n+1] = d_m[n] + \alpha \varepsilon_n + \beta \Sigma_{i=0}^n \varepsilon_i,$$

where $\alpha$ and $\beta$ are predetermined weights. It is to be understood that the principles described herein are not limited to this second order example.

The signal $y_n$ may be generated at the message bit rate $R_b$ by DDP component 550 from carrier phase adjusted received signal samples $r_i e^{-j\theta_i}$ provided to DDP component 550 at the chip rate. As stated above, DDP output signal $y_n$ may be provided to channel gain estimation and tracking (CGET) component 560 by which the channel gain estimates $\hat{h}_m$ are compensated. As illustrated in FIG. 5, CGET component 560 may comprise a variable gain component 520 and an estimator component 530. In one embodiment, estimator component 530 computes channel gain estimates according to $$\hat{h}_m(n+1) = (1-\gamma)\hat{h}_m(n) + \gamma y_n a_n^*,$$

where $\gamma$ is a training weight and $a_n^*$ is the complex conjugate of the n-th message bit as recovered at the receiver. The channel gain estimates $\hat{h}_m$ may be used to initialize this second order estimation process. The complex conjugate of the channel gain updates $\hat{h}_m(n+1)$ are provided to variable gain component 520 to produce the path-dependent compensated signal $\hat{h}_m^* y_n$. For decision directed output, $a_n$ can be replaced by $\hat{a}_n = \text{sign}(\text{Re}\{\hat{h}_m^* y_n\})$.

Figure 6:
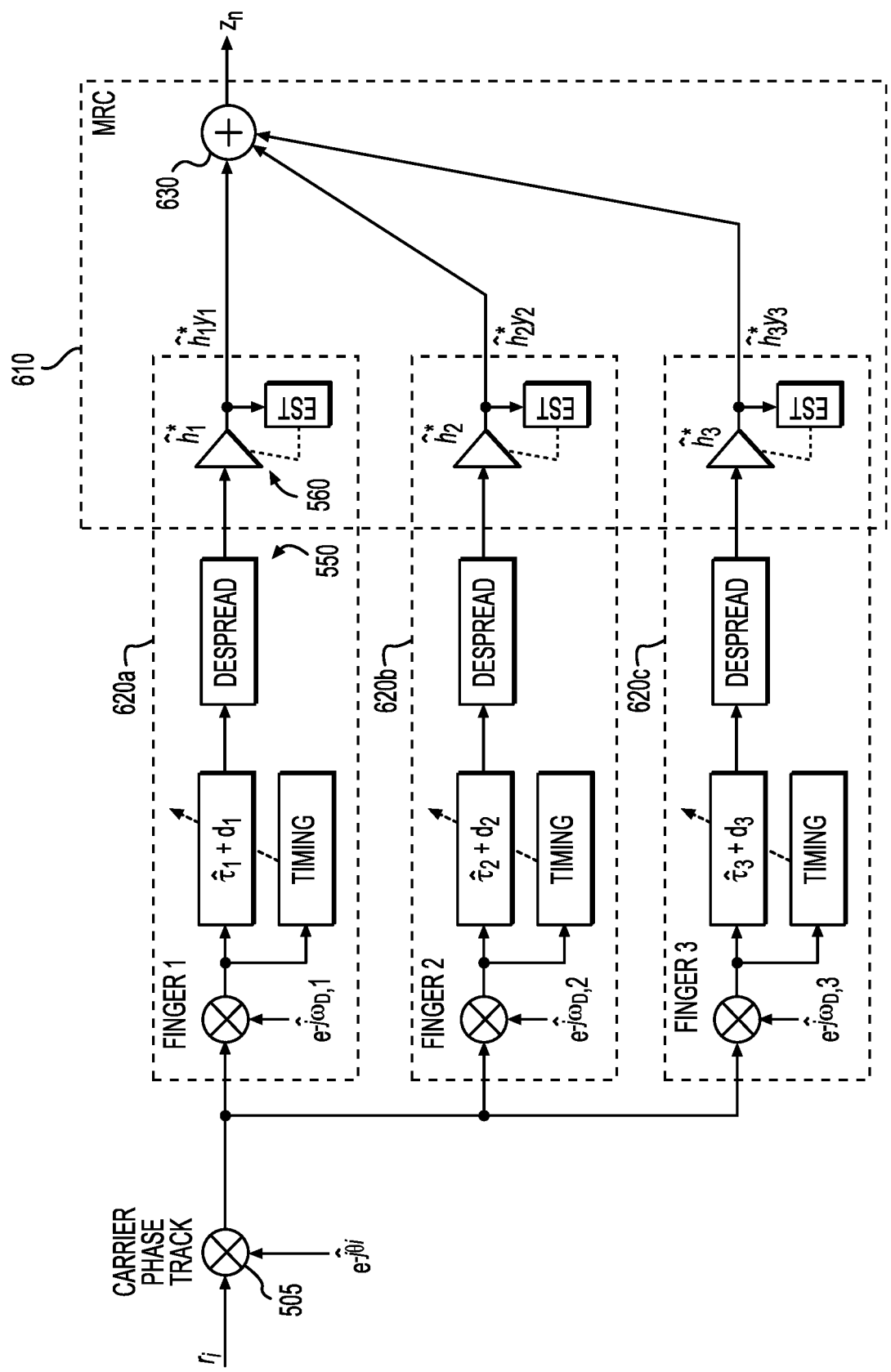
FIG. 6 is a schematic block diagram of an example embodiment according to principles of this disclosure using a maximal-ratio combiner (MRC).

FIG. 6 is a schematic block diagram of an example embodiment using a maximal-ratio combiner (MRC) 610 that combines the path-specific signals described above to yield a signal $z_n$ for which the signal-to-noise ratio is maximized. As illustrated in the figure, the signal $\hat{h}_m^* y_n$ may be produced by each of a set of finger components 620a-620c, representatively referred to herein as finger component(s) 620, and may be provided to a summing component 630. Each finger component 620, as representatively depicted in finger component 620a, may comprise a DDP component 550 and a CGET component 560, each of which may operate in a manner described above. Summing component 630 accepts the Doppler, delay and channel gain compensated signals and combines them. MRC combiner 610 controls each CGET 560 so that the gain of each channel is proportional to the root mean square (RMS) signal level and inversely proportional to the RMS noise level in that channel.

Figure 7:
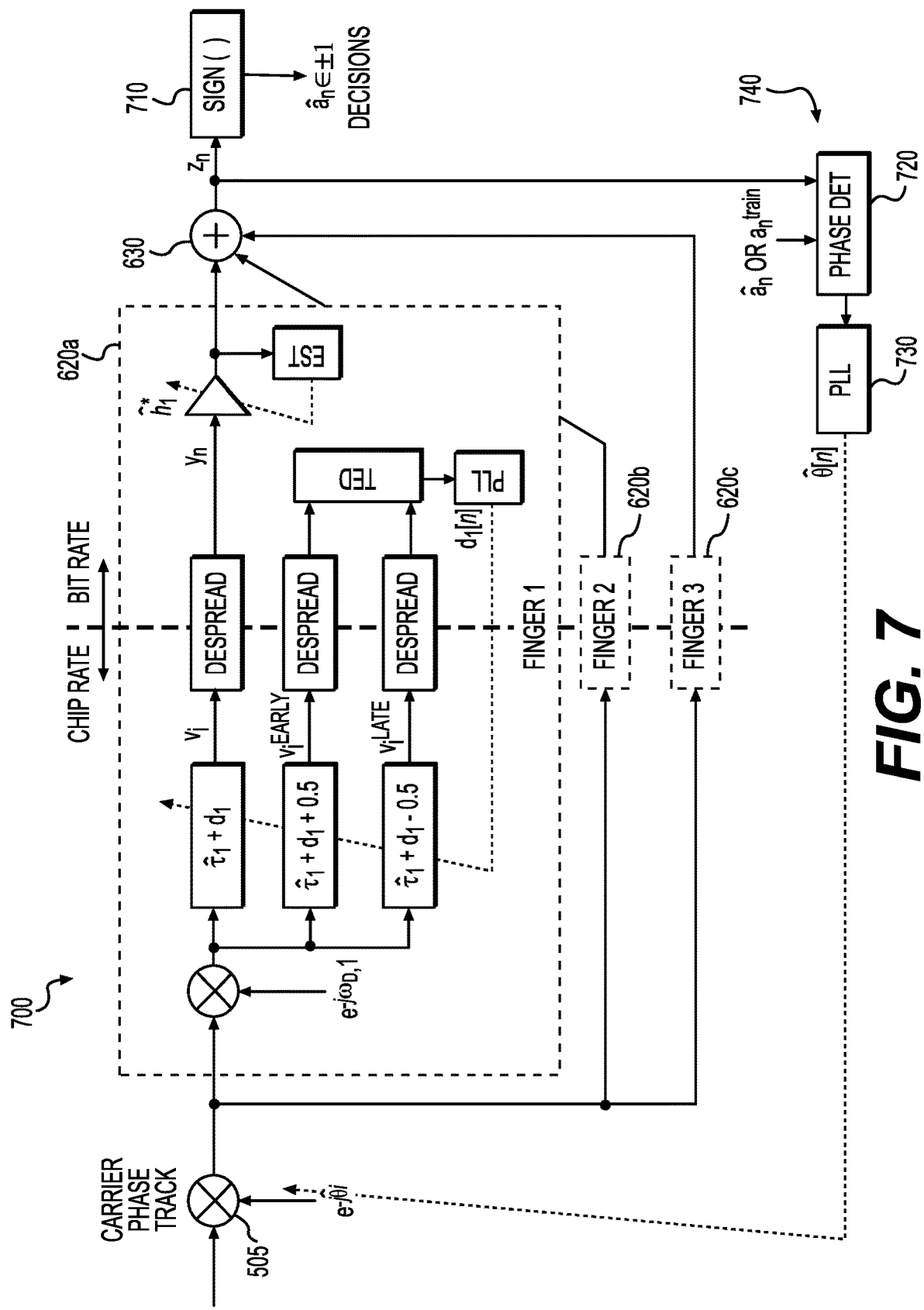
FIG. 7 is a schematic block diagram of a message bit detector by which principles of the present disclosure may be embodied.

FIG. 7 is a schematic block diagram of a message bit detector 700 by which principles of the present disclosure may be embodied. Message bit detector 700 includes finger components 620 and summing component 630 as described above, as well as a carrier phase tracking component 740 and a decision component 710. Decision component 710 may make a decision as to the state of the received message bit estimate $\hat{a}_n$. In the example embodiment, where the message bits $a_n \in \{-1,1\}$, decision component 710 may be realized by evaluating the arithmetic sign of the rake combined signal $z_n$, e.g., $\hat{a}_n = \text{sign}(\text{Re}\{z_n\})$.

As illustrated in FIG. 7, carrier phase tracking component 740 may comprise a phase detector component 720 and a PLL 730. Phase detector component 720 may determine a phase error, such as by $$\hat{\phi}_n = \sin^{-1}\left(\text{Im}\left\{\frac{y_n a_n^*}{|y_n|}\right\}\right).$$

Based on the error signal $\hat{\phi}_n$, PLL 730 may generate a signal indicative of a compensation angle according to $$\hat{\theta}(n+1) = \hat{\theta}(n) + \rho\hat{\phi}_n + \xi\Sigma_{i=0}^n\hat{\phi}_i,$$

where $\rho$ and $\xi$ are predetermined weights. The PLL output signal may be provided to carrier phase compensation component 505, which applies the phase compensation angle $\hat{\theta}_i$ to the received samples $r_i$ to produce the signal $r_i e^{-j\hat{\theta}_i}$ provided to each of the finger components 620.

Figure 8:
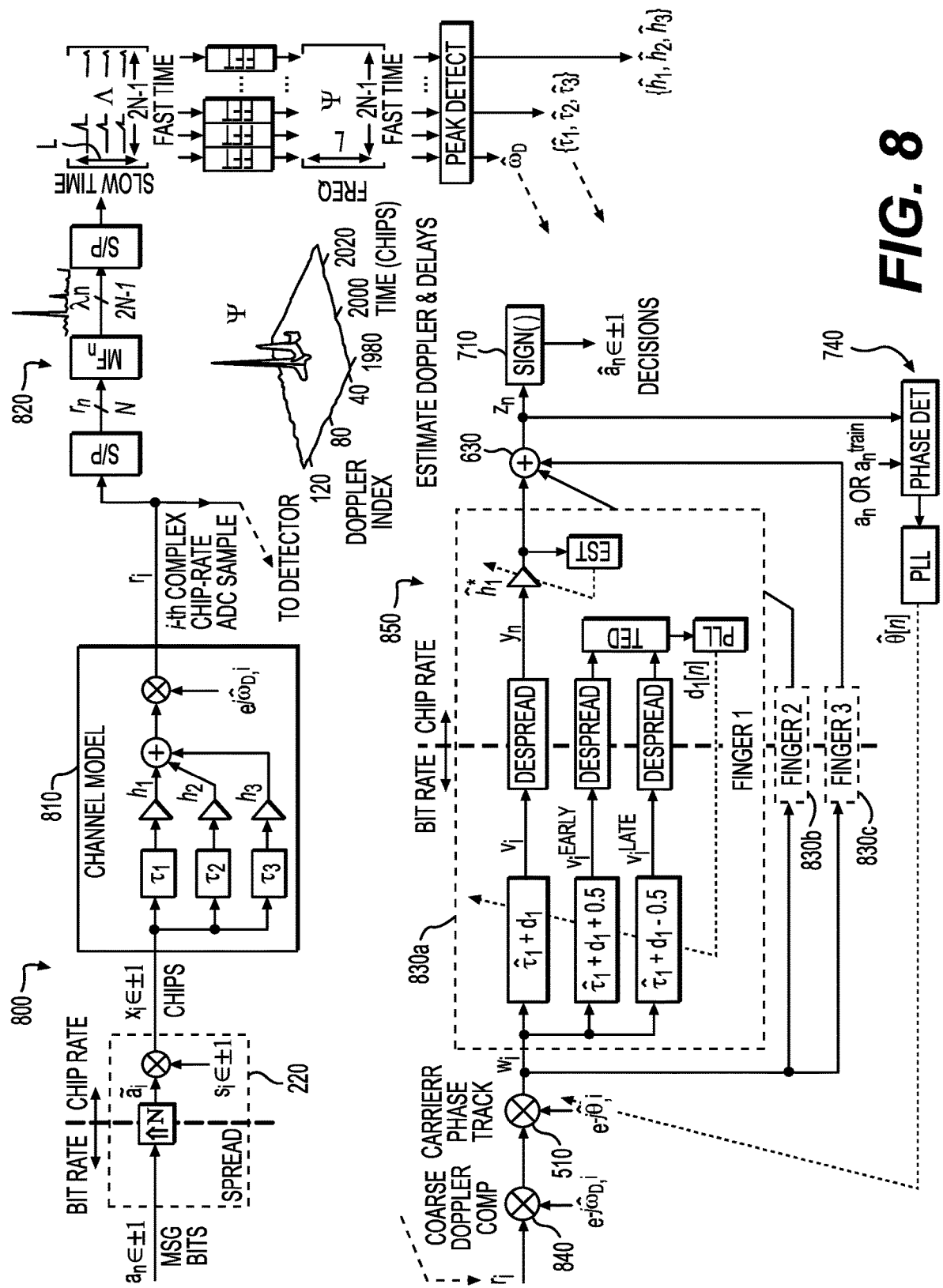
FIG. 8 is a schematic block diagram of an example receiver by which principles of this disclosure can be embodied.

FIG. 8 is a schematic block diagram of an example receiver 800 by which principles of this disclosure can be embodied. Receiver 800 may comprise an estimator component 820 and a detector component 850 that operate in a manner similar to analogous components described above. However, example receiver 800 has been modified for applications in which the Doppler shift $\omega_D$ differs very little from propagation path to propagation path. In such a case, the channel can be modeled with a single Doppler shift $\omega_D$ applied on the composite signal as opposed to being applied on a per-path basis. This is reflected in the channel model 810. Accordingly, as illustrated in the figure, a single Doppler estimate $\omega_D$ may be generated by estimator component 820 and the Doppler compensation is removed from each finger component 830a-830c and replaced by a single Doppler compensation component 840 that precedes the rake combining. Outside this modification, the operations performed by receiver 800 are substantially the same as those previously described.

Figure 9:
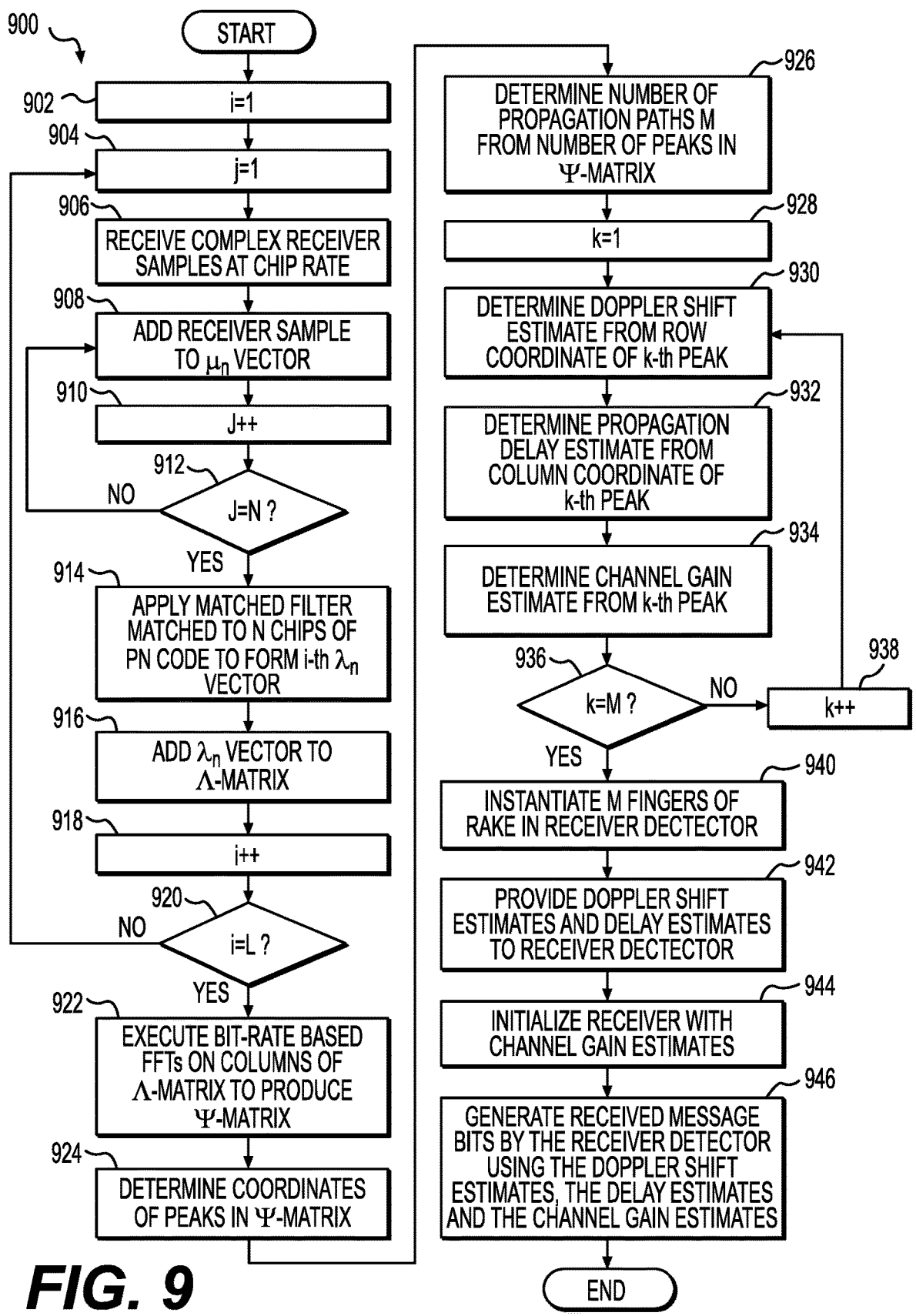
FIG. 9 is a flow diagram of an example receiver process by which principles of the present disclosure can be embodied.

FIG. 9 is a flow diagram of an example receiver process 900 by which principles of the present disclosure can be embodied. In operations 902 and 904, tracking indexes i, j are initialized to one (1). In operation 906, complex receiver signal samples are received at the chip rate. In operation 908, a receiver signal sample may be added to a $\mu_n$ vector, which is a temporary vector of receiver signal samples. In operation 910, the index j is incremented and, in operation 912, it is compared to N, the number of chips per message bit. If index j is less than N, process 900 returns to operation 908 and continues from that point.

If index j is equal to N, process 900 may transition to operation 914, whereby the N complex receiver samples in vector $\mu_n$ may be filtered by a matched filter that is maximally responsive to the j-th sequence of N chips of the PN code used to spread the transmitted signal. In operation 916, the 2N−1 filtered samples are added as the j-th vector $\lambda_n$ of the Λ-matrix 425. In operation 918, the index i may be incremented and in operation 920, index i may be compared to L, the number of message bits used for coarse signal acquisition. If index i is less than L, process 900 may return to operation 904 and continues from that point.

If index i is equal to L, operation 900 transitions to operation 922, by which message bit rate based FFTs are executed on respective columns of the Λ-matrix 425 to produce corresponding columns of the Ψ-matrix 435. The Ψ-matrix 435 contains elements of the frequency response sequences (generated by the FFTs) that are indexed in a column order defined by the sequence location of the elements of the filter response sequences on which the respective frequency transforms were computed and in a row order defined by a succession order of the sequences of chips of the PN code to which the respective matched filters that produced the respective filter response sequences (on which the FFTs are performed) are maximally responsive.

In operation 924, coordinates of the peaks (local maxima) in the Ψ-matrix 435 are determined. In operation 926, the number of propagation paths is determined from the number of peaks in the Ψ-matrix 435. In operation 928, a tracking index k is initialized to one (1). In operation 930, a Doppler shift estimate of the k-th propagation path is determined from the row coordinate of the k-th peak. In operation 932, a propagation delay estimate corresponding to the k-th propagation path is determined from the column coordinate of the k-th peak. In operation 934, a channel gain estimate is determined from the magnitude of the k-th peak. In operation 936, it is determined whether k is equal to the number of peaks M in the Ψ-matrix and, if not, process 900 may transition to operation 938, by which the k index is incremented. Process 900 may then transition to operation 930 and continues from that point.

If index k is equal to the number of peaks in the Ψ-matrix, then process 900 may transition to operation 940, by which a number of fingers of a rake combiner equivalent to the number of peaks is instantiated in a receiver detector. In operation 942, the Doppler and delay estimates are provided to the receiver detector for coarse signal acquisition. In operation 944, the adaptive channel gain estimator (embodied by CGETs, for example) is initialized with the channel gain estimates. In operation 946, message bits are generated by the receiver detector through coarse signal acquisition using the Doppler shift estimates, the propagation delay estimates and the channel gain estimates.

Figure 10:
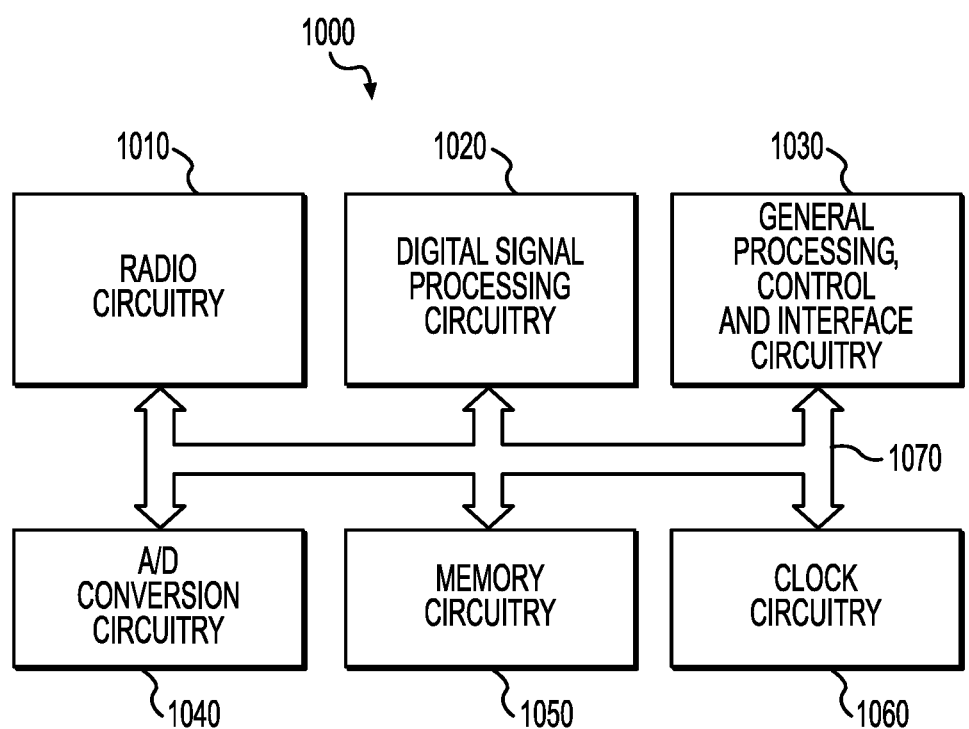
FIG. 10 is a schematic block diagram of example receiver infrastructure by which principles of the present disclosure can be embodied.

FIG. 10 is a schematic block diagram of example receiver infrastructure 1000 by which principles of the present disclosure can be embodied. In FIG. 10, receiver infrastructure 1000 is abstracted through specific functional modules, each of which leverages circuit technologies and architectures that may be specific to the functions being performed by that module. It will be appreciated by those skilled in the art that the division of the receiver 1000 into functional modules or blocks as illustrated in FIG. 10 is conceptual and is not intended to indicate hard boundaries of functionality or physical groupings of components. In practice, the illustrated functional modules may be combined, divided, and otherwise repartitioned into other modules without deviating from the scope and spirit of the present inventive concept.

Radio circuitry 1010 may comprise circuitry constructed or otherwise configured for processing high-frequency signals. Among other things, radio circuitry 1010 may implement a radio front-end that intercepts radio-frequency signals (e.g., 5 GHz) and generates therefrom a lower frequency receiver signal for information extraction. To that end, radio circuitry 1010 may include one or more antennas, low-noise amplifiers, filters, mixers, and other components (e.g., an isolator or transmit-receive switch) coupled one with the others (e.g., by transmission lines, electromagnetic couplers, general conductor paths and the like) to define suitable radio-frequency signal processing paths. The principles described in this disclosure are not limited to particular radio configurations so long as the information conveyed in the signal intercepted and processed thereby is recoverable using the foregoing techniques or their equivalents.

Analog-to-digital (A2D) circuitry 1040 may comprise circuitry constructed or otherwise configured for sampling the receiver signal produced by radio circuitry 1010. In certain embodiments, the sampling rate at which receiver signal samples are produced is equivalent to the chip rate (e.g., 135 MHz). A2D circuitry 1040 may generate complex numbers in a known machine-readable format corresponding to the state of the receiver signal at that sampling period. Numerous different A2D architectures may be used in conjunction with the principles of this disclosure, as the skilled artisan will appreciate and acknowledge.

Memory circuitry 1050 may comprise circuitry constructed or otherwise configured for storing various data items, including the complex receiver signal samples produced by A2D circuitry 1040. In addition to storing individual digital data items, memory circuitry 1050 may include memory management circuitry and components by which various data structures, e.g., vectors and matrixes, are efficiently stored and retrieved for vector and matrix processing. Additionally, memory circuitry 1050 may include circuitry constructed or otherwise configured for storing and retrieving processor instruction code for one or more processors, where the processor instruction code may implement, through execution by a suitable processor, one or more of the features of the estimator and detector described above, e.g., matched filters, FFT processors, peak detector, rake finger processors, MRC, etc. Memory circuitry 1050 may store system variables and data processing parameters as well. Memory circuitry 1050 may include both persistent memory components, e.g., flash drive, hard disk drive, read-only memory, etc. as well as volatile memory, such as random access memory. Multiple memory technologies and techniques may be used in conjunction with the principles described herein without departing from the spirit and intended scope thereof.

Digital signal processing (DSP) circuitry 1020 may include circuitry constructed or otherwise configured for processing complex digital signals, such as the receiver signal samples produced by A2D circuitry 1040 and stored in memory circuitry 1050. Such processing may proceed according to DSP instruction code stored in memory circuitry 1050 and may include operations such as addition, subtraction, multiplication and division of complex numbers, vector and matrix arithmetic, complex modulation, frequency transforms (e.g., FFTs), matched filtering, peak detection, data delays, signal despreading, timing error detection, PLL emulation, message bits decoding, etc., along with various other operations and algorithms discussed herein. DSP circuitry may include commercially-available programmable digital signal processors and/or other circuitry constructed or otherwise configured to perform various digital signal processing tasks. Such other circuitry may be constructed from programmable logic components (e.g., field programmable gate arrays), application specific integrated circuits, discrete logic and other circuit components. In certain embodiments, the operating frequency of DSP circuitry 1020 exceeds the sampling frequency at which receiver signal samples are generated.

General processing, control and interface (GPCI) circuitry 1030 may include circuitry constructed or otherwise configured for executing control, coordination and interface tasks. In one embodiment, GPCI circuitry 1030 implements a user interface through which a user can receive messages (decoded message bits) and modify various system control parameters. GPCI circuitry 1030 may also implement an application programming interface (API) through which external devices may remotely operate receiver infrastructure 1000. GPCI circuitry 1030 may include programmable logic, (e.g., microprocessors, microcontrollers) and human-machine interface devices (HMIDs) including displays, keyboards, mice, earphones, microphones, etc.

Clock circuitry 1060 may include circuitry constructed or otherwise configured for generating timing signals for receiver infrastructure 1000. In one embodiment, clock circuitry 1060 comprises a master oscillator from which all other timing signals (e.g., message bit rate clock, chip rate clock) are derived. Clock circuitry 1060 may include a stable local oscillator circuit and/or a coherent oscillator for down-converting the received information bearing signal into the receiver signal that is sampled. Clock circuitry 1060 may be constructed or otherwise configured to provide processor operating clock signals to DSP circuitry 1020 and GPCI circuitry 1030.

Receiver infrastructure 1000 may include bus circuitry 1070 constructed or otherwise configured for conveying the various signals described herein from one component to another. As such, bus circuitry 1070 may comprise conductive structures forming data and control signal paths that may have multi-conductor configurations corresponding with the data or control word length.

The techniques described above may be extended or otherwise modified to increase the range over which the estimated propagation delay is computed. To achieve this range expansion, a maximum expected delay $\tau_{max}$ may be specified such that computed delay estimates fall within the range $\{-\tau_{max}, \ldots, 0, \ldots, \tau_{max}\}$.

Figure 11A:
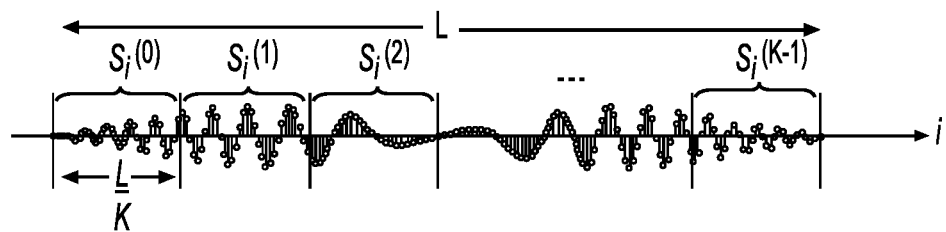
FIGS. 11A-11D depict a set of signals by which fundamentals of a modified technique embodying principles of the present disclosure is explained.

FIGS. 11A-11D, collectively referred to herein as FIG. 11, depict a set of signals by which fundamentals of the modified technique can be explained. FIG. 11A illustrates an arbitrary signal s[i], written as $s_i$ herein, that is known to the receiver. As illustrated in the figure, signal $s_i$ is L chips long and, in certain embodiments, is transmitted from a transmitter for receiver training or specifically for channel estimation.

In certain embodiments, signal $s_i$ is partitioned or otherwise segmented into K segments $\{s_i^{(0)}, \ldots, s_i^{(k)}, \ldots, s_i^{(K-1)}\}$, each including P chips of $s_i$ such that $$P = \frac{K}{L}.$$

Figure 11B:
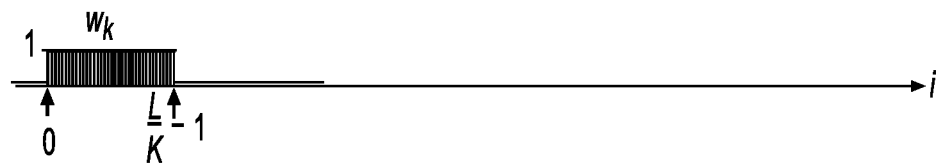

Such segmentation may be achieved through suitable windowing, such as by the window $w_i$ illustrated in FIG. 11B, so that $s_i^{(k)} = s_{kP+i} w_i$. When so segmented, $$s_i = \sum_{k=0}^{K-1} s_{i-k\frac{L}{K}}^{(k)}.$$

in accordance with the principles of the present disclosure, a filter bank of K matched filters may be constructed or otherwise configured such that each of the K matched filters is maximally responsive to a corresponding one of the segments $s_i^{(k)}$. With similarity to the technique described above, the output of each matched filter may be assigned to a corresponding row of a matrix and a frequency transform, e.g., an FFT, may be performed on each column of that matrix. Further aspects of these operations are described below.

It is to be noted that there is a performance tradeoff in the choice of P and, as such, P can be optimized based on the application of the present inventive concepts. A smaller P, and consequently a larger K, results in more FFT bins which allows the receiver to estimate larger Doppler frequencies without aliasing. Additionally, a smaller P reduces the amount of Doppler loss at the output of each filter resulting in more prominent peaks in the output waveform. On the other hand, a small P results in high computational complexity (measured by the number of multiply/add operations the receiver must execute) as K would be larger and the column-wise FFT would be K point.

Figure 11C:
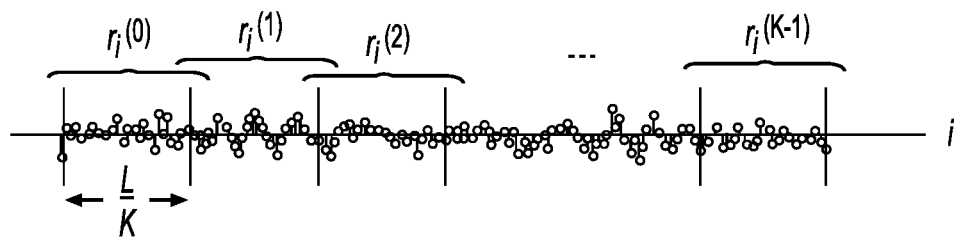

FIG. 11C depicts a signal $r_i$, which, as before, is the received version of $s_i$ transmitted by the transmitter, conveyed through the channel medium, and sampled at the chip rate by the receiver. Excluding, for the moment, consideration of channel gain and Doppler shift solely to simplify the explanation of the present embodiment in terms of propagation delay, the received signal $r_i$ can be expressed as $r_i = s_{i-\tau} + \eta_i$, where $\tau$ is the propagation delay $\tau \in T = \{-\tau_{max}, \ldots, 0, \ldots \tau_{max}\}$ being sought and $\eta_i$ is noise. One search strategy correlates the received signal with $s_{i-d}$ for all possible candidate delays d and then selects the value of d that resulted in the highest correlation. For the case of additive white Gaussian noise (AWGN), this strategy produces the maximum-likelihood estimate of $\tau$. Benefits of efficiency can be had by segmenting the received signal into K segments $r_i^{(k)}$, passing each $r_i^{(k)}$ through a filter matched to $s_i^{(k)}$ and indicating which filter of the K filters exhibited the greatest response. As in the example described above, this strategy may be realized by suitable circuitry, including programmable circuitry, capable of generating an output signal $\lambda_i$ for a given input signal $r_i$ by way of a filtering operation $\lambda_i = \sum_{k=0}^{K-1} r_i^{(k)} * s_{-i}^{(k)}$, where $s_i$ is the known signal and "*" is the convolution operator. This filtering operation can be implemented by a filter bank of K parallel filters respectively matched to segments of the known signal $s_i$.

Figure 11D:
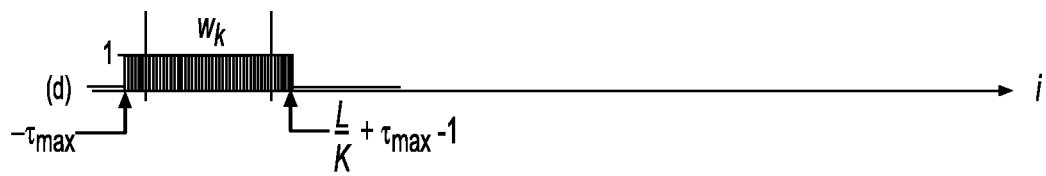

If $\lambda_i$ were to be computed for all i, the input to the k-th matched filter would have to be $$r_i^{(k)} = r_{k\frac{L}{K}+i},$$

a delayed/advanced version of the entire received signal. However, according to principles described herein, $\lambda_i$ may only be evaluated for values of i that correspond to propagation delays within $T = \{-\tau_{max}, \ldots, 0, \ldots \tau_{max}\}$. Thus, the input $r_i^{(k)}$ provided to the k-th matched filter can be limited or otherwise bound to contain only the relevant samples. This may be achieved by a windowing operation such that $$r_i^{(k)} = r_{k\frac{L}{K}+i} w_i',$$

where $w_i'$ is the window function. In certain embodiments, $w_i'$ may be a rectangular window for which $w_i' = 1$ for values of i that correspond to propagation delays within $$T' = \{-\tau_{max}, \ldots, \frac{L}{K} + \tau_{max} - 1\}$$

and $w_i' = 0$ elsewhere, as illustrated in FIG. 11D. Thus, the received signal $r_i$ is segmented into K segments, each of which being provided to a corresponding one of the K matched filters. It is to be observed in FIGS. 11A and 11C, that while $s_i$ and $r_i$ are both decomposed into K signal segments, the signal segments $s_i^{(k)}$ are disjoint while the segments $r_i^{(k)}$ overlap.

By the technique described in the foregoing paragraphs, the matched filter bank output $\lambda_i$ for values of i corresponding to $\tau \in T$ can be computed by segmenting the received sequence into K overlapping segments $r_i^{(0)}$ through $r_i^{(K-1)}$, passing the k-th segment through a filter matched to $s_i^{(k)}$ and adding the results. At the output of the k-th matched filter, $$\lambda_i^{(k)} = r_{k\frac{L}{K}+i} * s_{-i}^{(k)}.$$

For purposes of additional analysis by which the benefits of principles described herein can be further explained, the expression for $\lambda_i^{(k)}$ for values of i corresponding to $\tau \in T$ can be rewritten, after some manipulation, as $$\lambda_i^{(k)} = R^{(k,k)}(i-\tau) + \sum_{j \neq k} R^{(k,j)}\left(i - \tau - (k-j)\frac{L}{K}\right) + \eta_i^{(k)},$$

where $\eta_i^{(k)}$ is filtered noise and $R^{(k,j)}(x) = \sum_{v=-\infty}^{\infty} s_{v+x}^k s_v^j$ is the crosscorrelation function between the k-th signal segment $s_i^{(k)}$ and the x-th signal segment $s_i^{(x)}$. Under this definition, $R^{(k,k)}(x)$ is the autocorrelation of the k-th signal segment. While the summation limits on the crosscorrelation function are infinite to emphasize that it depends on the entire signal segment, there will in fact be only L/K non-zero terms in the sum, i.e., for $i \in \{0, \ldots, L/K-1\}$.

In the expression for $\lambda_i^{(k)}$ given above, many of the terms in the sum $\Sigma_{j \neq k}(\cdot)$ will be zero. For example, because each signal segment $s_i^{(k)}$ is L/K chips long, the crosscorrelation $R^{(k,j)}(x)$ will be zero whenever the lag exceeds this length, i.e., $|x| \geq L/K$. In the case when $\tau_{max} \leq L/K$, the expression for $\lambda_i^{(k)}$ simplifies to $$\lambda_i^{(k)} = R^{(k,k)}(i-\tau) + R^{(k,k-1)}\left(i - \tau + \frac{L}{K}\right) + R^{(k,k+1)}\left(i - \tau - \frac{L}{K}\right) + \eta_i^{(k)}.$$

Here, the first term will often dominate, especially when i is near $\tau$, where $R^{(k,k-1)}$ and $R^{(k,k+1)}$ compute the correlation between two potentially unrelated signal segments that barely overlap and $R^{(k,k)}$ computes the correlation of a signal with a barely delayed version of itself. In the extreme case when $i = \tau$, the second and third terms are identically zero.

When constructed or otherwise configured according to principles set forth in the preceding paragraphs, the impulse response of each matched filter in the filter bank is of length L/K and each input signal segment is of length $L/K + 2\tau_{max}$. Direct convolution would lead to an output signal of each matched filter that is of length $2L/K + 2\tau_{max} - 1$. However, embodiments of principles described herein require only $D = 2\tau_{max} + 1$ chips to estimate $\tau$, i.e., those whose index i corresponds with $\tau \in T = \{-\tau_{max}, \ldots, 0, \ldots \tau_{max}\}$. When so embodied on an infrastructure similar to that illustrated in FIG. 8, the $\Lambda$-matrix 425 is a K×D matrix whose k-th row (for $k \in \{0, 1, \ldots, K-1\}$) is $\lambda_i^{(k)}$ for values of i that correspond with $\tau \in T$.

Figure 12:
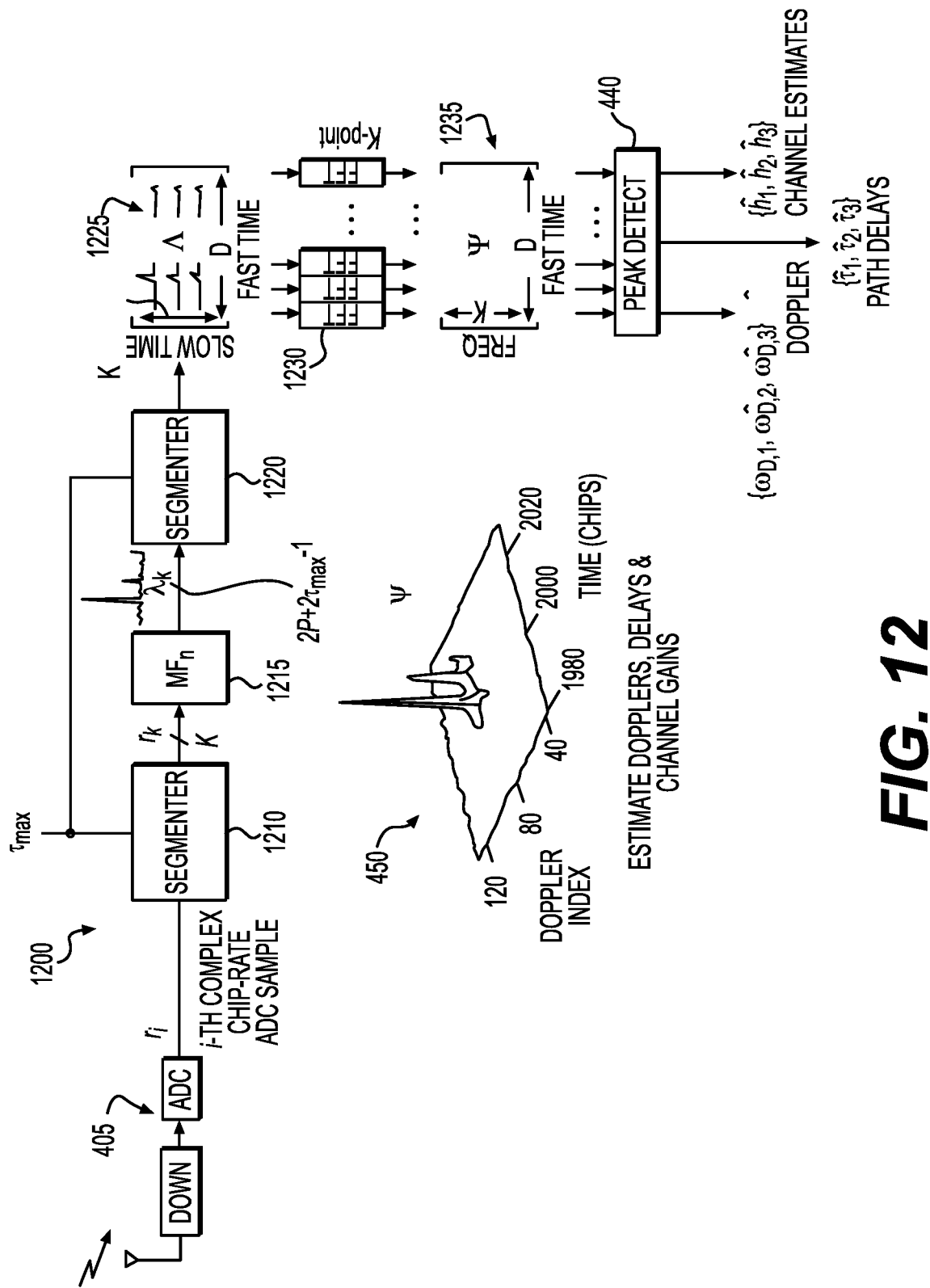
FIG. 12 is a schematic block diagram of an estimator by which principles of the present disclosure can be embodied.

FIG. 12 is a schematic block diagram of an estimator 1200 by which the present disclosure can be embodied. The operational flow through the example functional units illustrated in FIG. 12, with a few notable modifications, is the same as that described with reference to FIG. 4. Indeed, estimator 400 of FIG. 4 and estimator 1200 of FIG. 12 are both example implementations of broader principles conveyed by this disclosure. In view of their similarities, the description below of estimator 1200 will largely omit details of functionality that has been previously described and that are implemented in estimator 1200 in like manner as that implemented in estimator 400.

As illustrated in FIG. 12, complex receiver signal samples $r_i$ from a receiver front end 405 may be provided to a segmenting component 1210 that assembles the sequence $r_i$ into K successive sequences of $P + 2\tau_{max}$ successive samples $r_i$ (vectors $r_k$) based on a value of $\tau_{max}$ provided thereto by a system administrator or by an external system configured for estimating a maximum expected propagation delay. Each of data sets $r_k$ may be provided to respective K matched filters of matched filter bank 1215. Each of the matched filters in filter bank 1215 may be maximally responsive to a corresponding one of successive sequences of P successive chips of the known signal $s_i$, i.e., the matched filter filtering a first sequence of receiver signal samples $r_i$ may be maximally responsive to a first P chips of $s_i$, the matched filter filtering a second sequence of receiver signal samples $r_i$ may be maximally responsive to a second P chips of $s_i$, and so forth. The outputs of matched filter bank 1215 may be K 2P+2$\tau_{max}$-1 point filter response data sequences (vectors $\lambda_k$), which may be provided to a second segmenting component 1220. Segmenting component 1220 may be constructed or otherwise configured to limit vectors $\lambda_k$ to the D=2$\tau_{max}$+1 chips corresponding with $\tau \in T=\{-\tau_{max}, \ldots, 0, \ldots \tau_{max}\}$ and to align the D point filter response data sequences in the K×D Λ-matrix, having K rows corresponding to the K matched filters and D columns corresponding to the D point filter response data sequences. Each column in the Λ-matrix may be comprised of elements of the filter response sequences at like sequence locations thereof that are themselves sequential in terms of the succession order in $s_i$.

In accordance with the principles of this disclosure, each column of Λ-matrix 1225 or, alternatively, elements of the filter response sequences at like sequence locations thereof across the filter response sequences, may be provided to one of D fast Fourier transform (FFT) processors, representatively illustrated by FFT processor 1230. Each FFT processor 1230 computes the FFT for each column of 79 -matrix 1225 and the resulting frequency spectrum from each FFT processor 1230 may be stored in memory as a column in the K×D Ψ-matrix 1235. As in the example of FIG. 4, Ψ-matrix 1235 represents a parallel search over a parameter space comprising K different possible frequency offsets (rows of Ψ-matrix 1235) and D different delays (columns of Ψ-matrix 1235). The correct frequency offset and delay may manifest as an entry in Ψ-matrix 1235 having a local maximum, which may be identified by peak detector 440. As before, the number of propagation paths (from the number of peaks), estimates of the path delays $\hat{\tau}_m$ (from the Ψ-matrix column coordinate of the corresponding peak), estimates of the Doppler shifts $\hat{\omega}_{D,m}$ (from the Ψ-matrix row coordinate of the corresponding peak) and estimates of the channel gain $\hat{h}_m$ (from $$\hat{h}_m = \frac{\Psi_m}{e^{j\hat{\omega}_{D,m}\hat{\tau}_m} \sum_{k=0}^{K-1} e^{-j\hat{\omega}_{D,m}kP} A^{(k,k)}[0, \hat{\omega}_{D,m}]}$$

where $A^{(k,k)}[i, \omega_D] = x_i^{(k)} e^{j\omega_D i} * x_{-i}^{*(k)}$, and $x_i^{(k)}$ is the kth segment of the transmitted signal) may be determined and provided to a receiver signal detector, such as detector component 850 illustrated in FIG. 8, where $r_i$ at the signal detector is that of an information bearing signal as opposed to the known signal provided to estimator 1200.

Figure 13:
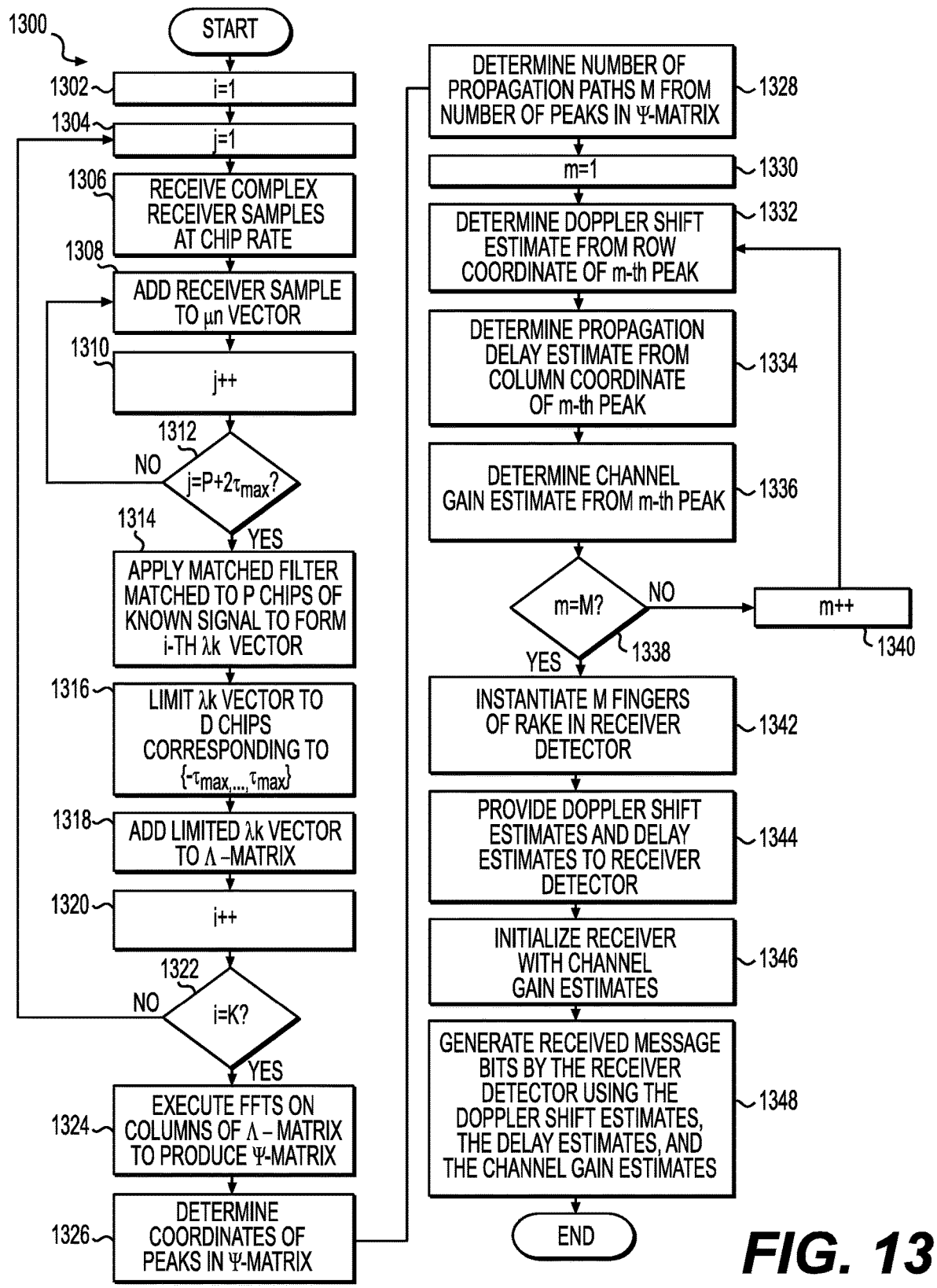
FIG. 13 is a flow diagram of an example receiver process 1300 by which principles of the present disclosure can be embodied.

FIG. 13 is a flow diagram of an example receiver process 1300 by which principles of the present disclosure can be embodied. In operations 1302 and 1304, tracking indexes i, j are initialized to one (1). In operation 1306, complex receiver signal samples are received at the chip rate. In operation 1308, a receiver signal sample may be added to a $\mu_n$ vector, which is a temporary vector of receiver signal samples. In operation 1310, the index j is incremented and, in operation 1312, it is compared to P+2$\tau_{max}$, the number of chips that are to be provided to the matched filter bank. If index j is less than P+2$\tau_{max}$, process 1300 returns to operation 1308 and continues from that point.

If index j is equal to P+2$\tau_{max}$, process 1300 may transition to operation 1314, whereby the P+2$\tau_{max}$ complex receiver samples in vector $\mu_k$ may be filtered by a matched filter that is maximally responsive to the j-th sequence of P chips of the known transmitted signal. In operation 1316, $\lambda_j$, the output of the j-th matched filter, is length-limited to D chips corresponding to $\{-\tau_{max}, \ldots, \tau_{max}\}$. In operation 1318, the D samples of the j-th vector $\lambda_j$ are stored as the j-th row of the Λ-matrix. In operation 1320, the index i may be incremented and in operation 1322, index i may be compared to K, the number of matched filters in the filter bank. If index i is less than K, process 1300 may return to operation 1304 and continue from that point.

If index i is equal to K, operation 1300 transitions to operation 1324, by which FFTs are executed on respective columns of the Λ-matrix to produce corresponding columns of the Ψ-matrix. The Ψ-matrix contains elements of the frequency response sequences (generated by the FFTs) that are indexed in a column order defined by the sequence location of the elements of the filter response sequences on which the respective frequency transforms were computed and in a row order defined by a succession order of the sequences of chips of the known transmitted signal to which the respective matched filters that produced the respective filter response sequences (on which the FFTs are performed) are maximally responsive.

In operation 1326, coordinates of the peaks (local maxima) in the Ψ-matrix are determined. In operation 1328, the number of propagation paths is determined from the number of peaks in the Ψ-matrix. In operation 1330, a tracking index k is initialized to one (1). In operation 1332, a Doppler shift estimate of the k-th propagation path is determined from the row coordinate of the k-th peak. In operation 1334, a propagation delay estimate corresponding to the k-th propagation path is determined from the column coordinate of the k-th peak. In operation 1336, a channel gain estimate is determined from the magnitude of the k-th peak. In operation 1338, it is determined whether k is equal to the number of peaks M in the Ψ-matrix and, if not, process 1300 may transition to operation 1340, by which the k index is incremented. Process 1300 may then transition to operation 1332 and continue from that point.

If index k is equal to the number of peaks in the Ψ-matrix, then process 1300 may transition to operation 1342, by which a number of fingers of a rake combiner equivalent to the number of peaks is instantiated in a receiver detector. In operation 1344, the Doppler and delay estimates are provided to the receiver detector for coarse signal acquisition. In operation 1346, the adaptive channel gain estimator (embodied by CGETs, for example) is initialized with the channel gain estimates. In operation 1348, message bits are generated by the receiver detector through coarse signal acquisition using the Doppler shift estimates, the propagation delay estimates and the channel gain estimates.

The inventive principles described above may be embodied in a variety of ways including those set forth in the paragraphs that follow.

(1) A method of estimating channel effects on a radio signal conveyed over a communication channel, the method comprising: generating sequential receiver signal samples by sampling a receiver signal at a sampling rate equivalent to a chip rate at which chips of a known signal are timed; segmenting the receiver signal samples into receiver signal segments; filtering the receiver signal segments by respective matched filters to produce respective filter response sequences, the matched filters being maximally responsive to respective known signal segments segmented from the known signal; assigning indexes to elements of the filter response sequences to define an array thereof, the elements of the filter response sequences being indexed in a row order defined by a sequence order of the known signal segments as distributed across the matched filters and in a column order defined by a sequence order in which the receiver signal samples of the receiver signal segments are filtered; computing frequency transforms of elements of the filter response sequences indexed in respective columns of the array to produce respective frequency response sequences; assigning indexes to elements of the frequency response sequences to define another array thereof, the elements of the frequency response sequences being indexed in a column order defined by a sequence order in which the receiver signal samples of the receiver signal segments are filtered and in a row order defined by a sequence order of the frequency response sequences; and jointly estimating the channel effects from characteristics of the other array at which at least one local maximum is located.

(2) The method (1) above, wherein the receiver signal is an information bearing signal modulated by a pseudo noise (PN) code and having encoded thereon message bits that are timed at a message bit rate.

(3) The method (1) or (2) above, wherein the known signal segments comprise a number of chips of the PN code equal to a number of chips contained in each of the message bits.

(4) The method of any one of (1) to (3) above, further comprising accepting, at a receiver terminating the communication channel, a value for a maximum expected propagation delay time.

(5) The method of any one of (1) to (4) above, wherein segmenting the receiver signal samples comprises segmenting the receiver signal samples to have a greater number of chips than the known signal segments, the greater number of chips being based on the maximum expected propagation delay time.

(6) The method of any one of (1) to (5) above, wherein assigning indexes to elements of the filter response sequences to define an array thereof comprises indexing only those elements of the filter response sequences that correspond to the interval $\{-\tau_{max}, \ldots, 0, \ldots, \tau_{max}\}$, where $\tau_{max}$ is the maximum expected propagation delay time.

(7) The method of any one of (1) to (6) above, wherein jointly estimating the channel effects comprises: determining a location of the local maximum in the other array by row and column indexes thereof; and estimating Doppler shift imparted on an information bearing signal from the row index of the location of the local maximum and propagation delay imparted on the information bearing signal from the column index of the location of the local maximum.

(8) The method of any one of (1) to (7) above, further comprising generating message bits of an information-bearing signal from the receiver signal samples using the estimated channel effects.

(9) The method of any one of (1) to (8) above, wherein jointly estimating the channel effects comprises: determining locations of local maxima in the other array by respective row and column indexes thereof; and estimating Doppler shift imparted on multipath copies of the information bearing signal from the row indexes of the local maxima and propagation delay times imparted on the multipath copies of the information bearing signal from the column indexes of the local maxima.

(10) An apparatus for estimating channel effects on a radio signal conveyed over a communication channel, the apparatus comprising: memory circuitry configured to store receiver signal samples; and processor circuitry configured to: generate the receiver signal samples by sequentially sampling a receiver signal at a sampling rate equivalent to a chip rate at which chips of a known signal are timed; segment the receiver signal samples into receiver signal segments; filter the receiver signal segments by respective matched filters to produce respective filter response sequences, the matched filters being maximally responsive to respective known signal segments segmented from the known signal; assign indexes to elements of the filter response sequences to define an array thereof, the elements of the filter response sequences being indexed in a row order defined by a sequence order of the known signal segments as distributed across the matched filters and in a column order defined by a sequence order in which the receiver signal samples of the receiver signal segments are filtered; compute frequency transforms of elements of the filter response sequences indexed in respective columns of the array to produce respective frequency response sequences; assign indexes to elements of the frequency response sequences to define another array thereof, the elements of the frequency response sequences being indexed in a column order defined by a sequence order in which the receiver signal samples of the receiver signal segments are filtered and in a row order defined by a sequence order of the frequency response sequences; and jointly estimate the channel effects from characteristics of the other array at which at least one local maximum is located.

(11) The apparatus (10) above, wherein the receiver signal is an information bearing signal modulated by a pseudo noise (PN) code and having encoded thereon message bits that are timed at a message bit rate.

(12) The apparatus of (10) or (11) above, wherein the known signal segments comprise a number of chips of the PN code equal to a number of chips contained in each of the message bits.

(13) The apparatus of any one of (10) to (12) above, wherein the processor circuitry is further configured to accept, at a receiver terminating the communication channel, a value for a maximum expected propagation delay time.

(14) The apparatus of any one of (10) to (13) above, wherein the processor circuitry is further configured to segment the receiver signal samples to have a greater number of chips than the known signal segments, the greater number of chips being based on the maximum expected propagation delay time.

(15) The apparatus of any one of (10) to (14) above, wherein the processor circuitry is further configured to assign indexes to elements of the filter response sequences to define an array thereof by indexing only those elements of the filter response sequences that correspond to the interval $\{-\tau_{max}, \ldots, 0, \ldots, \tau_{max}\}$, where $\tau_{max}$ is the maximum expected propagation delay time.

(16) The apparatus of any one of (10) to (15) above, wherein the processor circuitry is further configured to: determine a location of the local maximum in the other array by row and column indexes thereof; and estimate Doppler shift imparted on the information bearing signal from the row index of the location of the local maximum and propagation delay imparted on the information bearing signal from the column index of the location of the local maximum.

(17) An apparatus for recovering message bits representing information in an information bearing signal conveyed over a communication channel that imparts effects on the information bearing signal, the message bits being timed at a predetermined message bit rate, the method comprising: memory circuitry configured for storing receiver signal samples; and processing circuitry configured to: generate the receiver signal samples by sequentially sampling a receiver signal at a sampling rate equivalent to a chip rate at which chips of a known signal are timed; segment the receiver signal samples into receiver signal segments; filter the receiver signal segments by respective matched filters to produce respective filter response sequences, the matched filters being maximally responsive to respective known signal segments segmented from the known signal; assign indexes to elements of the filter response sequences to define an array thereof, the elements of the filter response sequences being indexed in a row order defined by a sequence order of the known signal segments as distributed across the matched filters and in a column order defined by a sequence order in which the receiver signal samples of the receiver signal segments are filtered; compute frequency transforms of elements of the filter response sequences indexed in respective columns of the array to produce respective frequency response sequences; assign indexes to elements of the frequency response sequences to define another array thereof, the elements of the frequency response sequences being indexed in a column order defined by a sequence order in which the receiver signal samples of the receiver signal segments are filtered and in a row order defined by a sequence order of the frequency response sequences; jointly estimate the channel effects from characteristics of the other array at which local maxima are located; and generate the message bits from the receiver signal samples using the estimated effects of the communication channel.

(18) The apparatus (17) above, wherein the processing circuitry is further configured to: determine locations of the local maxima in the other array by respective row and column indexes thereof; and estimate Doppler shift imparted on multipath copies of the information bearing signal from the row indexes of the local maxima and propagation delay times imparted on the multipath copies of the information bearing signal from the column indexes of the local maxima.

(19) The apparatus of (17) or (18) above, wherein the processing circuitry is further configured to: compensate for the propagation delay times by delaying the receiver samples across detector circuit paths by corresponding delay times equal to the respective estimates thereof, the detector circuit paths corresponding to respective propagation paths over which the multipath copies of the information bearing signal are conveyed; refine the delay times by which the receiver samples are delayed via a delay locked loop; and generate the message bits from the delayed receiver samples.

(20) The apparatus of any one of (17) to (19) above, wherein the processing circuitry is further configured to: compensate for the Doppler shifts by modulating the receiver signal samples across the detector circuit paths by respective frequencies corresponding to the respective estimates of the Doppler shifts; and generate the message bits from the compensated signal samples.

(21) A method of estimating communication channel effects on an information bearing signal conveyed over a communication channel, the information bearing signal having encoded thereon message bits representing the information borne on the information bearing signal that are timed at a message bit rate, the method comprising: generating sequential receiver signal samples by sampling a receiver signal derived from the information bearing signal at a sampling rate equivalent to a chip rate at which chips of a pseudo-noise (PN) code are timed, the chip rate being a number N times the message bit rate; filtering successive sequences of the number N receiver signal samples by respective matched filters to produce respective filter response sequences, each of the matched filters being maximally responsive to a corresponding one of successive sequences of the number N chips of the PN code; computing frequency transforms of elements of the filter response sequences at like sequence locations thereof across the filter response sequences to produce frequency response sequences, the frequency transforms being based on the message bit rate; assigning indexes to elements of the frequency response sequences to define an array thereof, the elements of the frequency response sequences being indexed in the array in a column order defined by the sequence location of the elements of the filter response sequences for which the respective frequency transforms were computed and in a row order defined by a succession order of the sequences of chips of the PN code to which the respective matched filters that produced the respective filter response sequences are maximally responsive; and jointly estimating the communication channel effects from characteristics of the array at which at least one local maximum is located.

(22) The method (21) above, wherein jointly estimating the communication channel effects comprises: determining a location of the local maximum in the array by row and column indexes thereof; and estimating Doppler shift imparted on the information bearing signal from the row index of the location of the local maximum and propagation delay imparted on the information bearing signal from the column index of the location of the local maximum.

(23) The method of (21) or (22) above, wherein jointly estimating the communication channel effects further comprises estimating channel gain from a value of the local maximum.

(24) A method of recovering message bits representing information in an information bearing signal conveyed over a communication channel that imparts communication channel effects thereon, the message bits being timed at a predetermined message bit rate, the method comprising: generating sequential receiver signal samples by sampling a receiver signal derived from the information bearing signal at a sampling rate equivalent to a chip rate at which chips of a pseudo-noise (PN) code are timed, the chip rate being a number N times the message bit rate; filtering successive sequences of the number N receiver signal samples by respective matched filters to produce respective filter response sequences, each of the matched filters being maximally responsive to a corresponding one of successive sequences of the number N chips of the PN code; computing frequency transforms of elements of the filter response sequences at like sequence locations thereof across the filter response sequences to produce frequency response sequences, the frequency transforms being based on the message bit rate; assigning indexes to elements of the frequency response sequences to define an array thereof, the elements of the frequency response sequences being indexed in the array in a column order defined by the sequence location of the elements of the filter response sequences for which the respective frequency transforms were computed and in a row order defined by a succession order of the sequences of chips of the PN code to which the respective matched filters that produced the respective filter response sequences are maximally responsive; jointly estimating the communication channel effects from characteristics of the array at which local maxima are located; and generating the message bits from the receiver signal samples using the estimated communication channel effects.

(25) The method (24) above, wherein jointly estimating the communication channel effects comprises: determining locations of the local maxima in the array by respective row and column indexes thereof; and estimating Doppler shift imparted on multipath copies of the information bearing signal from the row indexes of the local maxima and propagation delay times imparted on the multipath copies of the information bearing signal from the column indexes of the local maxima.

(26) The method of (24) or (25) above, wherein generating the message bits from the receiver signal samples comprises: compensating for the propagation delay times by delaying the receiver samples across detector circuit paths by corresponding delay times equal to the respective estimates thereof, the detector circuit paths corresponding to respective propagation paths over which the multipath copies of the information bearing signal are conveyed; refining the delay times by which the receiver samples are delayed via a delay locked loop; and generating the message bits from the delayed receiver samples.

(27) The method of any one of (24) to (26) above, wherein generating the message bits from the receiver signal samples further comprises: compensating for the Doppler shifts by modulating the receiver signal samples across the detector circuit paths by respective frequencies corresponding to the respective estimates of the Doppler shifts; and generating the message bits from the compensated signal samples.

(28) The method of any one of (24) to (27) above, further comprising: combining the compensated receiver signal samples from each of the detector circuit paths using maximal-ratio combining; and generating the message bits from the combined receiver signal samples.

(29) The method of any one of (24) to (28) above, wherein jointly estimating the communication channel effects further comprises estimating channel gains from values of the local maxima.

(30) The method of any one of (24) to (29) above, wherein generating the message bits from the receiver signal samples comprises: compensating for the channel gains using the channel gain estimates of each propagation path; and generating the message bits from the compensated receiver signal samples.

(31) An apparatus for estimating communication channel effects on an information bearing signal conveyed over a communication channel, the information bearing signal having encoded thereon message bits representing the information borne on the information bearing signal that are timed at a message bit rate, the apparatus comprising: memory circuitry configured to store receiver signal samples; and processor circuitry configured to: generate the receiver signal samples by sampling a receiver signal derived from the information bearing signal at a sampling rate equivalent to a chip rate at which chips of a pseudo-noise (PN) code are timed, the chip rate being a number N times the message bit rate; filter successive sequences of the number N receiver signal samples by respective matched filters to produce respective filter response sequences, each of the matched filters being maximally responsive to a corresponding one of successive sequences of the number N chips of the PN code; compute frequency transforms of elements of the filter response sequences at like sequence locations thereof across the filter response sequences to produce frequency response sequences, the frequency transforms being based on the message bit rate; assign indexes to elements of the frequency response sequences to define an array thereof, the elements of the frequency response sequences being indexed in the array in a column order defined by the sequence location of the elements of the filter response sequences for which the respective frequency transforms were computed and in a row order defined by a succession order of the sequences of chips of the PN code to which the respective matched filters that produced the respective filter response sequences are maximally responsive; and jointly estimate the communication channel effects from characteristics of the array at which at least one local maximum is located.

(32) The apparatus (31) above, wherein the processor circuitry is further configured to: determine a location of the local maximum in the array by row and column indexes thereof; and estimate Doppler shift imparted on the information bearing signal from the row index of the location of the local maximum and propagation delay imparted on the information bearing signal from the column index of the location of the local maximum.

(33) The apparatus of (31) or (32) above, wherein the processor circuitry is further configured to estimate channel gain from a value of the local maximum.

(34) An apparatus for recovering message bits representing information in an information bearing signal conveyed over a communication channel that imparts effects on the information bearing signal, the message bits being timed at a predetermined message bit rate, the method comprising: memory circuitry configured for storing receiver signal samples; and processing circuitry configured to: generate the receiver signal samples by sampling a receiver signal derived from the information bearing signal at a sampling rate equivalent to a chip rate at which chips of a pseudo-noise (PN) code are timed, the chip rate being a number N times the message bit rate; filter successive sequences of the number N receiver signal samples by respective matched filters to produce respective filter response sequences, each of the matched filters being maximally responsive to a corresponding one of successive sequences of the number N chips of the PN code; compute frequency transforms of elements of the filter response sequences at like sequence locations thereof across the filter response sequences to produce frequency response sequences, the frequency transforms being based on the message bit rate; assign indexes to elements of the frequency response sequences to define an array thereof, the elements of the frequency response sequences being indexed in the array in a column order defined by the sequence location of the elements of the filter response sequences for which the respective frequency transforms were computed and in a row order defined by a succession order of the sequences of chips of the PN code to which the respective matched filters that produced the respective filter response sequences are maximally responsive; jointly estimate the communication channel effects from characteristics of the array at which local maxima are located; and generate the message bits from the receiver signal samples using the estimated effects of the communication channel.

(35) The apparatus (34) above, wherein the processing circuitry is further configured to: determine locations of the local maxima in the array by respective row and column indexes thereof; and estimate Doppler shift imparted on multipath copies of the information bearing signal from the row indexes of the local maxima and propagation delay times imparted on the multipath copies of the information bearing signal from the column indexes of the local maxima.

(36) The apparatus (34) or (35) above, wherein the processing circuitry is further configured to: compensate for the propagation delay times by delaying the receiver samples across detector circuit paths by corresponding delay times equal to the respective estimates thereof, the detector circuit paths corresponding to respective propagation paths over which the multipath copies of the information bearing signal are conveyed; refine the delay times by which the receiver samples are delayed via a delay locked loop; and generate the message bits from the delayed receiver samples.

(37) The apparatus of any one of (34) to (36) above, wherein the processing circuitry is further configured to: compensate for the Doppler shifts by modulating the receiver signal samples across the detector circuit paths by respective frequencies corresponding to the respective estimates of the Doppler shifts; and generate the message bits from the compensated signal samples.

(38) The apparatus of any one of (34) to (37) above, wherein the processing circuitry is further configured to: combine the compensated receiver signal samples from each of the detector circuit paths using maximal-ratio combining; and generate the message bits from the combined receiver signal samples.

(39) The apparatus of any one of (34) to (38) above, wherein the processing circuitry is further configured to estimate channel gains from values of the local maxima.

(40) The apparatus of any one of (34) to (39) above, wherein the processing circuitry is further configured to: compensate for the channel gains using the channel gain estimates of each propagation path; and generate the message bits from the compensated receiver signal samples.

The terminology used herein is for the purpose of describing particular embodiments only and is not intended to be limiting of the principles described herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description in this disclosure has been presented for purposes of illustration and description, but is not intended to be exhaustive or limited to the embodiments disclosed. The embodiments were chosen and described in order to best explain the principles of the underlying concept and the practical application, and to enable others of ordinary skill in the art to understand the principles for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the disclosure should therefore be determined not with reference to the description above, but with reference to the appended claims, along with their full range of equivalents.

The invention claimed is:

1. A method of estimating channel effects on a radio signal conveyed over a communication channel, the method comprising:
generating sequential receiver signal samples by sampling a receiver signal at a sampling rate equivalent to a chip rate at which chips of a known signal are timed;
segmenting the receiver signal samples into receiver signal segments;
filtering the receiver signal segments by respective matched filters to produce respective filter response sequences, the matched filters being maximally responsive to respective known signal segments segmented from the known signal;
assigning indexes to elements of the filter response sequences to define an array thereof, the elements of the filter response sequences being indexed in a first row order defined by a first sequence order of the known signal segments as distributed across the matched filters and in a first column order defined by a second sequence order in which the receiver signal samples of the receiver signal segments are filtered;
computing frequency transforms of elements of the filter response sequences indexed in respective columns of the array to produce respective frequency response sequences;
assigning indexes to elements of the frequency response sequences to define another array thereof, the elements of the frequency response sequences being indexed in a second column order defined by a third sequence order in which the receiver signal samples of the receiver signal segments are filtered and in a second row order defined by a fourth sequence order of the frequency response sequences; and
jointly estimating the channel effects from characteristics of the other array at which at least one local maximum is located.

2. The method of claim 1, wherein the receiver signal is an information bearing signal modulated by a pseudo noise (PN) code and having encoded thereon message bits that are timed at a message bit rate.

3. The method of claim 2, wherein the known signal segments comprise a number of chips of the PN code equal to a number of chips contained in each of the message bits.

4. The method of claim 1, further comprising accepting, at a receiver terminating the communication channel, a value for a maximum expected propagation delay time.

5. The method of claim 4, wherein the segmenting of the receiver signal samples comprises segmenting the receiver signal samples to have a greater number of chips than the known signal segments, the greater number of chips being based on the maximum expected propagation delay time.

6. The method of claim 5, wherein the assigning of indexes to elements of the filter response sequences to define the array thereof comprises indexing only those elements of the filter response sequences that correspond to the interval $\{-\tau_{max}, \ldots, 0, \ldots, \tau_{max}\}$, where $\tau_{max}$ is the maximum expected propagation delay time.

7. The method of claim 1, wherein the jointly estimating of the channel effects comprises:
determining a location of the local maximum in the other array by a row index and a column index thereof; and
estimating Doppler shift imparted on an information bearing signal from the row index of the location of the local maximum and propagation delay imparted on the information bearing signal from the column index of the location of the local maximum.

8. The method of claim 1, further comprising generating message bits of an information bearing signal from the receiver signal samples using the jointly estimated channel effects.

9. The method of claim 8, wherein the jointly estimating of the channel effects comprises:
   determining locations of local maxima in the other array by respective row and column indexes thereof; and
   estimating Doppler shift imparted on multipath copies of the information bearing signal from the row indexes of the local maxima and propagation delay times imparted on the multipath copies of the information bearing signal from the column indexes of the local maxima.

10. An apparatus for estimating channel effects on a radio signal conveyed over a communication channel, the apparatus comprising:
   memory circuitry configured to store receiver signal samples; and
   processor circuitry configured to:
      generate the receiver signal samples by sequentially sampling a receiver signal at a sampling rate equivalent to a chip rate at which chips of a known signal are timed;
      segment the receiver signal samples into receiver signal segments;
      filter the receiver signal segments by respective matched filters to produce respective filter response sequences, the matched filters being maximally responsive to respective known signal segments segmented from the known signal;
      assign indexes to elements of the filter response sequences to define an array thereof, the elements of the filter response sequences being indexed in a first row order defined by a first sequence order of the known signal segments as distributed across the matched filters and in a first column order defined by a second sequence order in which the receiver signal samples of the receiver signal segments are filtered;
      compute frequency transforms of elements of the filter response sequences indexed in respective columns of the array to produce respective frequency response sequences;
      assign indexes to elements of the frequency response sequences to define another array thereof, the elements of the frequency response sequences being indexed in a second column order defined by a third sequence order in which the receiver signal samples of the receiver signal segments are filtered and in a second row order defined by a fourth sequence order of the frequency response sequences; and
      jointly estimate the channel effects from characteristics of the other array at which at least one local maximum is located.

11. The apparatus of claim 10, wherein the receiver signal is an information bearing signal modulated by a pseudo noise (PN) code and having encoded thereon message bits that are timed at a message bit rate.

12. The apparatus of claim 11, wherein the known signal segments comprise a number of chips of the PN code equal to a number of chips contained in each of the message bits.

13. The apparatus of claim 10, wherein the processor circuitry is further configured to accept, at a receiver comprising the processor circuitry and terminating the communication channel, a value for a maximum expected propagation delay time.

14. The apparatus of claim 13, wherein the processor circuitry is further configured to segment the receiver signal samples to have a greater number of chips than the known signal segments, the greater number of chips being based on the maximum expected propagation delay time.

15. The apparatus of claim 14, wherein the processor circuitry is further configured to assign indexes to elements of the filter response sequences to define the array thereof by indexing only those elements of the filter response sequences that correspond to the interval $\{-\tau_{max}, \ldots, 0, \ldots, \tau_{max}\}$, where $\tau_{max}$ is the maximum expected propagation delay time.

16. The apparatus of claim 10, wherein the processor circuitry is further configured to:
   determine a location of the local maximum in the other array by a row index and a column index thereof; and
   estimate Doppler shift imparted on the information bearing signal from the row index of the location of the local maximum and propagation delay imparted on the information bearing signal from the column index of the location of the local maximum.

17. An apparatus for recovering message bits representing information in an information bearing signal conveyed over a communication channel that imparts effects on the information bearing signal, the message bits being timed at a predetermined message bit rate, the apparatus comprising:
   memory circuitry configured for storing receiver signal samples; and
   processing circuitry configured to:
      generate the receiver signal samples by sequentially sampling a receiver signal at a sampling rate equivalent to a chip rate at which chips of a known signal are timed;
      segment the receiver signal samples into receiver signal segments;
      filter the receiver signal segments by respective matched filters to produce respective filter response sequences, the matched filters being maximally responsive to respective known signal segments segmented from the known signal;
      assign indexes to elements of the filter response sequences to define an array thereof, the elements of the filter response sequences being indexed in a first row order defined by a first sequence order of the known signal segments as distributed across the matched filters and in a first column order defined by a second sequence order in which the receiver signal samples of the receiver signal segments are filtered;
      compute frequency transforms of elements of the filter response sequences indexed in respective columns of the array to produce respective frequency response sequences;
      assign indexes to elements of the frequency response sequences to define another array thereof, the elements of the frequency response sequences being indexed in a second column order defined by a third sequence order in which the receiver signal samples of the receiver signal segments are filtered and in a second row order defined by a fourth sequence order of the frequency response sequences;
      jointly estimate the channel effects from characteristics of the other array at which local maxima are located; and
      generate the message bits from the receiver signal samples using the estimated effects of the communication channel.

18. The apparatus of claim 17, wherein the processing circuitry is further configured to:
- determine locations of the local maxima in the other array by respective row and column indexes thereof; and
- estimate Doppler shift imparted on multipath copies of the information bearing signal from the row indexes of the local maxima and propagation delay times imparted on the multipath copies of the information bearing signal from the column indexes of the local maxima.

19. The apparatus of claim 18, wherein the processing circuitry is further configured to:
- compensate for the propagation delay times by delaying the receiver samples across detector circuit paths by corresponding delay times equal to the respective estimates thereof, the detector circuit paths corresponding to respective propagation paths over which the multipath copies of the information bearing signal are conveyed;
- refine the delay times by which the receiver samples are delayed via a delay locked loop; and
- generate the message bits from the delayed receiver samples.

20. The apparatus of claim 19, wherein the processing circuitry is further configured to:
- compensate for the Doppler shifts by modulating the receiver signal samples across the detector circuit paths by respective frequencies corresponding to the respective estimates of the Doppler shifts; and
- generate the message bits from the compensated signal samples.

* * * * *